United States Patent
Sudo et al.

(10) Patent No.: US 12,478,636 B2
(45) Date of Patent: Nov. 25, 2025

(54) COMPOSITION FOR TREATING INTERVERTEBRAL DISC

(71) Applicants: National University Corporation Hokkaido University, Sapporo (JP); Mochida Pharmaceutical Co., Ltd, Tokyo (JP)

(72) Inventors: Hideki Sudo, Hokkaido (JP); Takeru Tsujimoto, Hokkaido (JP); Norimasa Iwasaki, Hokkaido (JP); Satoshi Shimizu, Tokyo (JP); Mitsuko Isaji, Tokyo (JP)

(73) Assignees: National University Corporation Hokkaido University, Hokkaido (JP); Mochida Pharmaceutical Co., Ltd., Tokyo (JP)

( * ) Notice: Subject to any disclaimer, the term of this patent is extended or adjusted under 35 U.S.C. 154(b) by 293 days.

(21) Appl. No.: 16/086,081

(22) PCT Filed: Jan. 27, 2017

(86) PCT No.: PCT/JP2017/002925
§ 371 (c)(1),
(2) Date: Sep. 18, 2018

(87) PCT Pub. No.: WO2017/163603
PCT Pub. Date: Sep. 28, 2017

(65) Prior Publication Data
US 2020/0289547 A1    Sep. 17, 2020

(30) Foreign Application Priority Data
Mar. 23, 2016   (JP) .................. 2016-058396

(51) Int. Cl.
*A61K 31/734* (2006.01)
*A61F 2/44* (2006.01)
*A61K 9/19* (2006.01)

(52) U.S. Cl.
CPC ............ *A61K 31/734* (2013.01); *A61F 2/442* (2013.01); *A61K 9/19* (2013.01); *A61F 2002/444* (2013.01)

(58) Field of Classification Search
CPC .................. A61K 31/734; A61K 9/19
See application file for complete search history.

(56) References Cited

U.S. PATENT DOCUMENTS

| | | |
|---|---|---|
| 7,914,537 B2 | 3/2011 | Boyd et al. |
| 8,372,394 B2 | 2/2013 | Iwasaki et al. |
| 9,216,201 B2 | 12/2015 | Iwasaki et al. |
| 9,821,027 B2 | 11/2017 | Iwasaki et al. |
| 2003/0069639 A1 | 4/2003 | Sander et al. |
| 2007/0150060 A1 | 6/2007 | Trieu |
| 2009/0082719 A1 | 3/2009 | Yeung |
| 2009/0136576 A1 | 5/2009 | Calvosa et al. |
| 2010/0015102 A1 | 1/2010 | Iwasaki et al. |
| 2011/0097367 A1 | 4/2011 | Wallrapp et al. |
| 2013/0189231 A1* | 7/2013 | Iwasaki ............... A61K 35/28 424/93.7 |
| 2014/0213524 A1 | 7/2014 | Iwasaki et al. |
| 2016/0067309 A1 | 3/2016 | Iwasaki et al. |
| 2018/0338921 A1* | 11/2018 | Endo .................. A61K 47/36 |
| 2020/0030367 A1 | 1/2020 | Kondo et al. |

FOREIGN PATENT DOCUMENTS

| | | |
|---|---|---|
| JP | 10-503667 A | 4/1998 |
| JP | 11-253547 A | 9/1999 |
| JP | 2008-543449 A | 12/2008 |
| JP | 2011-509724 A | 3/2011 |
| WO | WO 95/31946 A1 | 11/1995 |
| WO | WO 2006/136905 A2 | 12/2006 |
| WO | WO 2006/138690 A2 | 12/2006 |
| WO | WO 2008/102855 A1 | 8/2008 |
| WO | WO-2009/090020 A1 | 7/2009 |
| WO | WO 2013/027854 A1 | 2/2013 |

OTHER PUBLICATIONS

Kalaf et al., "Characterization of slow-gelling alginate hydrogels for intervertebral disc tissue-engineering applications", Materials Science and Engineering, 63, 2016, pp. 198-210. (Year: 2016).*
Lewis, "Nucleus pulposus replacement and regeneration/repair technologies: Present status and future prospects", J Biomed Mater Res Part B, 100B, 2012, pp. 1702-1720. (Year: 2012).*
Oxford English Dictionary, "Suppress", https://www.oed.com/view/Entry/194721?rskey=DO6wb6&result=1#eid, accessed May 5, 2022 (Year: 2022).*
Wang et al. Tissue Engineering, 20(5), 2014, 908-920.*
Meakin et al., J Clin Biomech, 2001, 16, 560-565.*
Bidarra et al., "Injectable alginate hydrogels for cell delivery in tissue engineering," Acta Biomaterialia, 2014, 10:1646-1662.
Bron et al., "Engineering alginate for intervertebral disc repair," Journal of the Mechanical Behavior of Biomedical Materials, 2011, 4:1196-1205.
Buckwalter et al., "Articular Cartilage and Intervertebral Disc Proteoglycans Differ in Structure: An Electron Microscopic Study," Journal of Orthopaedic Research, 1989, 7(1):146-151.
Chou et al., "Photo-crosslinked Alginate Hydrogels Support Enhanced Matrix Accumulation by Nucleus Pulposus Cells In Vivo," Osteoarthritis Cartilage, Oct. 2009, 17(10):1377-1384.

(Continued)

*Primary Examiner* — Kyle A Purdy
(74) *Attorney, Agent, or Firm* — Foley & Lardner LLP

(57) ABSTRACT

The present invention provides a composition for filling the nucleus pulposus of an intervertebral disc, the composition containing a low endotoxin monovalent metal salt of alginic acid. The composition is applied to a nucleus pulposus site of a subject, is used so as to be cured partially after application, and has fluidity when applied to the nucleus pulposus site. Accordingly, a composition for filling nucleus pulposus is provided, the composition being capable of promoting the regeneration of the nucleus pulposus of an intervertebral disc.

25 Claims, 11 Drawing Sheets

(56) References Cited

OTHER PUBLICATIONS

Cloyd et al., "Material properties in unconfined compression of human nucleus pulposus, injectable hyaluronic acid-based hydrogels and tissue engineering scaffolds," Eur. Spine J., 2007, 16:1892-1898.
Foss et al., "Chondroprotective supplementation promotes the mechanical properties of injectable scaffold for human nucleus pulposus tissue engineering," Journal of the Mechanical Behavior of Biomedical Materials, 2014, 29:56-67.
Growney Kalaf et al., "Characterization of slow-gelling alginate hydrogels for intervertebral disc tissue-engineering applications," Materials Science and Engineering, 2016, 63:198-210.
Iatridis et al., "Role of biomechanics in intervertebral disc degeneration and regenerative therapies: what needs repairing in the disc and what are promising biomaterials for its repair?", The Spine Journal, 2013, 13(3):243-262.
Pattappa et al. "Diversity of intervertebral disc cells: phenotype and function," J. Anat., 2012, 221:480-496.
Yuliu et al., "Experimental Study of Treatment of Intervertebral Disc Degeneration with Bone Mesenchymal Cells Combined with Alginate," Journal of Tissue Engineering and Reconstructive Surgery, Feb. 2011, 7(1):20-22 and 29, with English translation.
Japanese Decision to Grant a Patent with the English Language translation, dated Jan. 29, 2019 for Japanese Application No. 2018-507084.
Office Action dated May 25, 2022 in CA 3,018,152.
U.S. Appl. No. 16/713,659, filed Dec. 13, 2019, Iwasaki et al.
Gu, Qisheng, Alginate Based Biomedical Materials and Clinical Medicine, Shanghai Scientific & Technical Publishers, 1st Edition Apr. 2015 (1st printing), ISBN:978-7-5478-2537-2, p. 234, with English translation.
Notice of Reexamination dated Jun. 6, 2025 in CN 201780018143.7, with English translation.

\* cited by examiner (A) 4w

HE

SafraninO control  Suction only  A-2

(B) 12w

HE

SafraninO control  Suction only  A-2

COMPOSITION FOR TREATING INTERVERTEBRAL DISC

CROSS-REFERENCE TO RELATED APPLICATIONS

This application is a National Stage application of PCT/JP2017/002925, filed Jan. 27, 2017, which claims priority from Japanese application JP 2016-058396, filed Mar. 23, 2016.

TECHNICAL FIELD

The present invention relates to a composition for treating an intervertebral disc, more particularly, to a composition for filling a nucleus pulposus of an intervertebral disc.

BACKGROUND ART

A vertebral column is a columnar skeleton having a series of vertebrae, which provides support for the trunk and the head. Vertebrae are connected via an intervertebral disc between them. An intervertebral disc is a disc-shaped avascular tissue structured to have an annulus fibrosus surrounding a nucleus pulposus at the center and also provided with endplates above and below. The nucleus pulposus of the intervertebral disc is a gel-like highly elastic structure with a high water content which consists of nucleus pulposus cells and an extracellular matrix thereof, and serves as a cushion for absorbing force placed between the vertebral bodies. The annulus fibrosus consists of lamellae fibrocartilage and collagen layers surround it, and limits the rotary movement between the vertebral bodies. The endplates are hyaline cartilage tissue strongly connecting the intervertebral disc to the vertebral body.

The nucleus pulposus at the center of the intervertebral disc has a distinctive composition compared to the annulus fibrosus, the endplates and other cartilage tissues. Specifically, the extracellular matrix of the nucleus pulposus is mainly composed of water (70-90%; decreases with age), Type II collagen (20% of the dry weight) and proteoglycans (50% of the dry weight), and is characteristic in having a higher ratio of proteoglycans to collagen as compared to other cartilage tissues such as the endplates and the articular cartilage (Non-patent document 1). Meanwhile, the extracellular matrix of other cartilage tissues such as articular cartilage has a high ratio of collagen than proteoglycans. The function of the intervertebral disc as a shock absorber owes much to its rich water content. Such a rich water content is mainly maintained because glycosaminoglycans attached to the core proteins of the proteoglycans are negatively charged and therefore attract water. It is also disclosed that the structure and the size of the proteoglycans existing in the intervertebral disc differ from the proteoglycans existing in the articular cartilage, and that these differences were particularly significant for the proteoglycans in the nucleus pulposus (Non-patent document 2).

The nucleus pulposus, the annulus fibrosus and the endplates of an intervertebral disc have different structures and functions, and are respectively maintained by cell groups with distinct phenotypes. The nucleus pulposus cells existing in the nucleus pulposus are round and produce a proteoglycan-rich matrix. The cells existing in the annulus fibrosus are embedded in a collagen fiber matrix. These cells in the intervertebral disc have distinct phenotypes and are also recently reported to be phenotypically different from articular chondrocytes (Non-patent document 1).

An intervertebral disc can be degenerated or injured due to aging, trauma, disease or the like. Degeneration of the intervertebral disc refers to a state where the cell number, the water content, the extracellular matrix (Type II collagen, aggrecan, etc.) and the like are decreased in the intervertebral disc, which may progress such that the intervertebral disc can no longer perform the function as a shock absorber. The degeneration and the injury of the intervertebral disc are specifically disc herniation, discopathy, degenerative spondylolisthesis, pyogenic discitis, spondylosis deformans, spinal canal stenosis, intervertebral disc injuries due to trauma, and the like. For example, in a case of disc herniation, deformation or a crack of the annulus fibrosus encaging the nucleus pulposus constitutes a hernia that protrudes outside the intervertebral disc, where the protruding nucleus pulposus places pressure on the spinal nerve, causing pain, loss of sensation or the like.

Intervertebral nucleotomy (resection) is one of the treatments for disc herniation, which has been confirmed to be effective to a certain extent. An intervertebral nucleotomy (resection), however, is known to sometimes end in the progress of the degenerative changes of the intervertebral disc since the surgical site is not treated after the intervertebral nucleotomy. When a part of the nucleus pulposus is removed by intervertebral nucleotomy, a cavity is formed at the nucleus pulposus site (herein, also referred to as a "defective part"). Since the nucleus pulposus has little self-repairing capacity and regenerating capacity, the cavity of the nucleus pulposus is likely to be physically weak as well. Moreover, fibroblast-like cells may accumulate in the cavity part to form a tissue with dynamic characteristics different from those intrinsic to the original nucleus pulposus. Therefore, recurrence rate of herniation after the intervertebral nucleotomy is high. The recurrence rate within 5 years after the intervertebral nucleotomy is said to be about 4-15%, but the recent long-term data shows that more than half of the cases are associated with recurrence after 10 years. While recurrence of herniation requires another surgery, the spinal nerves are embedded in the scar tissue created after the first surgery and thus finding out the location of the spinal nerve would be difficult. Even if the location of the spinal nerve can be confirmed, the thick and hard scar would make separating the spinal nerve from the surrounding tissue extremely difficult. An extremely difficult technique would be required for another surgery. Accordingly, there is a need for establishment of a surgical procedure that is not associated with recurrence of herniation and scarring after the intervertebral nucleotomy.

As an attempt of treating an intervertebral disc disease, for example, a therapeutic method for introducing a polymer electrolyte material (polyelectrolyte material) into a space of an intervertebral disc without removing the nucleus pulposus or the annulus fibrosus has been proposed, where alginate is included as one of the many specific examples of the polymer electrolytes (Patent document 1). Furthermore, a method of enhancing the function of a intervertebral disc comprising injecting a cartilage-protecting material such as glycosaminoglycan into a site in need has been proposed, where an amphipathic derivative of sodium alginate is included as one of the many specific examples of the cartilage-protecting material (Patent document 2). A device for injecting an antacid into an intervertebral disc is also disclosed (Patent document 3). Besides injection of an antacid, it may optionally be used for injecting an intervertebral disc filler, where alginate cross-linked with calcium or barium is included as one of the many specific examples of the filler (Patent document 3). In these documents, however, alginate is merely included as one of the many specific examples, and no specific method or example is described for using alginate.

Moreover, hydrogels of an alginate or the like have been considered as a material for filling the nucleus pulposus. In using hydrogels of an alginate or the like as a material for filling the nucleus pulposus, their mechanical strength has been a problem. Therefore, a material which can keep its shape for a certain period of time when used in vivo has been recommended and it would be good to have high hardness (Non-patent documents 3-9).

Thus, use of an alginate has been proposed for regeneration of a cartilage of, for example, a joint, a thoracic wall, an intervertebral disc or a meniscus (Patent documents 4-5).

PRIOR ART DOCUMENTS

Patent Documents

Patent document 1: Specification of US Patent Application Publication No. 2007/0150060
Patent document 2: Specification of US Patent Application Publication No. 2003/0069639
Patent document 3: Specification of US Patent Application Publication No. 2009/0082719
Patent document 4: International Patent Publication No. 2008/102855
Patent document 5: International Patent Publication No. 2013/027854

Non-Patent Documents

Non-patent document 1: Journal of Anatomy (2012) 221, p. 480-496
Non-patent document 2: Journal of Orthopaedic Research (1989) 7, p. 146-151
Non-patent document 3: Eur Spine J (2007) 16, p. 1892-1898
Non-patent document 4: Osteoarthritis and Cartilage (2009) 17, p. 1377-1384
Non-patent document 5: Journal of the Mechanical Behavior of Biomedical Materials (2014) 29, p. 56-67
Non-patent document 6: Journal of the Mechanical Behavior of Biomedical Materials (2011) 4, p. 1196-1205
Non-patent document 7: Acta Biomateria (2014) 10, p. 1646-1662
Non-patent document 8: Spine J (2013) 13 (3), p. 243-262
Non-patent document 9: Materials Science and Engineering 63 (2016) p. 198-210

SUMMARY OF INVENTION

Problems to be Solved by the Invention

Under the above-described circumstances, the objective of the present invention is to provide a composition for filling a nucleus pulposus of an intervertebral disc, which is capable of promoting regeneration of the nucleus pulposus. In addition, the objective is to provide a composition for filling the nucleus pulposus that allows a relatively easy filling operation with a low risk of complications such as compression on the spinal nerve.

Means for Solving the Problems

The present inventors have studied the possibility of filling the nucleus pulposus with a biocompatible material, as a therapeutic method for intervertebral disc degeneration and injury. Until now, use of hydrogels of an alginate or the like as a material for filling the nucleus pulposus has particularly been examined in this therapeutic field with a concern in the mechanical strength of the hydrogels and it has been recommended to keep their shape for a certain period of time upon use in vivo. On the contrary, the present inventors found that regeneration of an nucleus pulposus of an intervertebral disc can be promoted by injecting a composition containing a low endotoxin sodium alginate in a sol state into a nucleus pulposus site and brining a crosslinking agent into contact with a composition-filling inlet on the surface of the intervertebral disc in order to cure a part of the composition for preventing leakage, thereby suppressing degeneration of the nucleus pulposus of the intervertebral disc and increasing the ratio of the Type II collagen-positive cells favorable for nucleus pulposus regeneration. In addition, they found that degeneration of the whole tissue of the intervertebral disc including the annulus fibrosus can also be suppressed.

The present inventors conducted further studies based on such findings, thereby accomplishing the present invention.

Thus, the present invention is as follows.

[1] A composition for filling a nucleus pulposus of an intervertebral disc comprising a low endotoxin monovalent metal salt of alginic acid, which is used so as to be applied to a nucleus pulposus site of a subject and partially cured after the application and which has fluidity when applied to the nucleus pulposus site.

[1A] A composition for filling a nucleus pulposus of an intervertebral disc which is used so as to be applied to a nucleus pulposus site of a subject and then partially cured, which comprises a low endotoxin monovalent metal salt of alginic acid, and which has fluidity when applied to the nucleus pulposus site.

[2] The composition according to either one of [1] and [1A] above, wherein the composition is cured by bringing a crosslinking agent into contact with at least a part of the surface of the composition.

[3] The composition according to either one of [1]-[2] above, wherein the composition is applied to the nucleus pulposus site via a composition-filling inlet on the surface of the intervertebral disc, and the composition is partially cured by bringing a crosslinking agent into contact with the composition-filling inlet on the surface of the intervertebral disc.

[4] The composition according to any one of [1]-[3] above, wherein the composition is applied to the nucleus pulposus site by applying the composition to a nucleus pulposus defective site formed by removing at least a part of the nucleus pulposus.

[5] The composition according to any one of [1]-[4] above, wherein the viscosity of the composition having fluidity is 100 mPa·s-30,000 mPa·s.

[5A] The composition according to any one of [1]-[4] above, wherein the apparent viscosity of the composition having fluidity is 100 mPa·s-30,000 mPa·s as measured with a cone-plate viscometer under a condition of 20° C.

[6] The composition according to any one of [1]-[5A] above, wherein the weight-average molecular weight of the low endotoxin monovalent metal salt of alginic acid is 80,000 or more as measured by a GPC-MALS method.

[6A] The composition according to any one of [1]-[5A] above, wherein the weight-average molecular weight (absolute molecular weight) of the low endotoxin monovalent metal salt of alginic acid is 80,000 or more as measured by a GPC-MALS method.

[7] The composition according to any one of [1]-[6A] above, wherein the concentration of the monovalent metal salt of a low endotoxin alginic acid is 0.5 w/v %-5 w/v %.

[7A] The composition according to any one of [1]-[6A] above, wherein the concentration of the monovalent metal salt of a low endotoxin alginic acid is 0.5 w/w %-5 w/w %.

[8] The composition according to any one of [1]-[7A] above, wherein the composition does not contain the crosslinking agent in an amount that allows curing of the composition before the application to the nucleus pulposus site of the subject.

[9] The composition according to any one of [1]-[8] above, wherein the composition does not contain a cell.

[10] The composition according to any one of [2]-[9] above, wherein the crosslinking agent is a divalent or higher valent metal ion compound.

[10A] The composition according to [10] above, wherein the divalent or higher valent metal ion compound is at least one metal ion compound selected from the group consisting of $Ca^{2+}$, $Mg^{2+}$, $Ba^{2+}$ and $Sr^{2+}$.

[11] The composition according to any one of [1]-[10A] above, wherein the composition is used for treating, preventing or suppressing recurrence of an intervertebral disc degeneration and/or an intervertebral disc injury.

[12] The composition according to [11] above, wherein the intervertebral disc degeneration and/or the intervertebral disc injury is at least one selected from disc herniation, discopathy, degenerative spondylolisthesis, pyogenic discitis, spondylosis deformans, spinal canal stenosis, and an intervertebral disc injury.

[13] The composition according to any one of [1]-[12] above, wherein the composition is in a dry state before being applied to the nucleus pulposus site.

[13A] The composition according to any one of [1]-[12] above, wherein the composition is in a dry state or in a solution state before being applied to the nucleus pulposus site.

[14] The composition according to either one of [13] and [13A] above, wherein the monovalent metal salt of a low endotoxin alginic acid in a dry state is a lyophilizate.

[14A] The composition according to any one of [1]-[14] above, wherein the partial curing of the composition can be shown when at least 50% of the volume of the composition in a 6 mm diameter test tube can be suctioned with a syringe with a 21G needle after filling the test tube with 500 µL of a low endotoxin sodium alginate and a crosslinking agent by employing the same method and ratio for using the crosslinking agent as those for filling in the nucleus pulposus site, and leaving it to stand for an hour in vitro according to Example 4 of the present specification.

[14B] The composition according to any one of [1]-[14A] above, wherein the composition having fluidity has fluidity that allows injection with a 21G needle after leaving the composition to stand at 20° C. for an hour.

[15] A kit for filling a nucleus pulposus of an intervertebral disc, the kit comprising at least the composition according to any one of [1] to [14B] above and a crosslinking agent.

[16] A method for treating, preventing or suppressing recurrence of an intervertebral disc degeneration and/or an intervertebral disc injury, the method comprising the steps of:
applying a composition having fluidity and containing a low endotoxin monovalent metal salt of alginic acid to a nucleus pulposus site of an intervertebral disc of a subject in need of treatment, prevention or suppression of recurrence; and
curing a part of the applied composition.

[17] The method according to [16] above, wherein the intervertebral disc degeneration and/or the intervertebral disc injury is at least one selected from the group consisting of disc herniation, discopathy, degenerative spondylolisthesis, pyogenic discitis, spondylosis deformans, spinal canal stenosis, and an intervertebral disc injury.

[18] Use of a low endotoxin monovalent metal salt of alginic acid for producing a composition for treating, preventing or suppressing recurrence of an intervertebral disc degeneration and/or an intervertebral disc injury, wherein the composition is used so as to be applied to a nucleus pulposus site of a subject and partially cured after the application, and the composition has fluidity when applied to the nucleus pulposus site.

[19] The use according to [18] above, wherein the intervertebral disc degeneration and/or the intervertebral disc injury is at least one selected from the group consisting of disc herniation, discopathy, degenerative spondylolisthesis, pyogenic discitis, spondylosis deformans, spinal canal stenosis, and an intervertebral disc injury.

[20] A monovalent metal salt of a low endotoxin alginic acid for use in treating, preventing or suppressing recurrence of an intervertebral disc degeneration and/or an intervertebral disc injury, wherein a composition having fluidity and containing a low endotoxin monovalent metal salt of alginic acid is applied to a nucleus pulposus site of an intervertebral disc of a subject in need of treatment, prevention or suppression of recurrence of an intervertebral disc degeneration and/or an intervertebral disc injury, and a part of the applied composition is cured.

Effect of Invention

The present invention provides a composition for filling a nucleus pulposus of an intervertebral disc, which is capable of promoting regeneration of the nucleus pulposus. The composition of the present invention is capable of suppressing degenerative change not only in the nucleus pulposus of the intervertebral disc but also in the whole tissue of the intervertebral disc including the annulus fibrosus. In addition, the composition of the present invention has an effect of increasing the ratio of the Type II collagen-positive hyaline cartilage-like cells in the nucleus pulposus.

In one preferable aspect of the present invention, a composition of the present invention can be used as a material for filling the nucleus pulposus for treating, preventing, or suppressing recurrence of a disease related to an intervertebral disc degeneration such as disc herniation, an intervertebral disc injury due to trauma or the like, and else.

Furthermore, a composition of a preferable aspect of the present invention is capable to be injected in a sol state into a nucleus pulposus site by using a syringe or the like and also allows filling not only under direct vision but also upon transdermal nucleotomy (incision of about 5 mm), under a microscope (incision of about 3-4 cm) and under an endoscope (incision of about 1-2 cm). Therefore, burden on patients can be reduced and manipulation can be relatively easy.

Moreover, a conventional material for filling the nucleus pulposus that is entirely gelled has a risk of compressing and damaging the spinal nerve if by any chance it protrudes into the spinal canal. On the other hand, a composition of a more preferable aspect of the present invention has little concern about such complications and thus is safe since it is gelled only on the surface.

A composition of a particularly preferable aspect of the present invention is capable of preventing recurrence of herniation and scarring after the intervertebral nucleotomy (resection). Moreover, in one preferable aspect of the present invention, application of the composition of the present invention to an nucleus pulposus of an intervertebral disc having an intervertebral disc degeneration and/or an intervertebral disc injury for the treatment would reduce burden on an intervertebral disc adjacent to the treated intervertebral disc, thereby preventing and/or alleviating degeneration of the adjacent intervertebral disc.

The composition of the present invention satisfies any one or more of the above-described advantages.

BREIF DESCRIPTION OF DRAWINGS

FIG. 6(A) shows pictures of stained intervertebral disc tissue specimens at four weeks after the surgery. A normal control group, a suction only group and a treatment group (Group A-2). FIG. 6(B) shows pictures of stained intervertebral disc tissue specimens at twelve weeks after the surgery. A normal control group, a suction only group and a treatment group (Group A-2).

Figure 7:
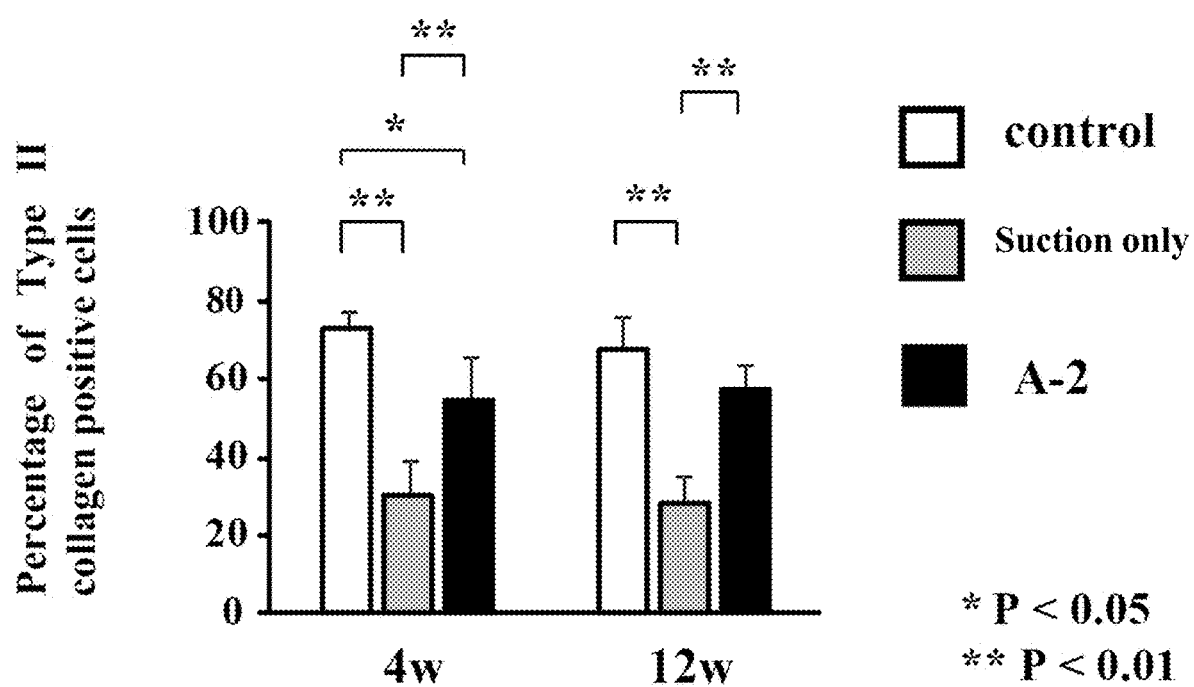

FIG. 7 is a graph showing percentages of anti-Type II collagen antibody-positive cells to the cell numbers in the intervertebral disc tissue section at four and twelve weeks after the surgery. A normal control group, a suction only group and a treatment group (Group A-2).

Figure 8:
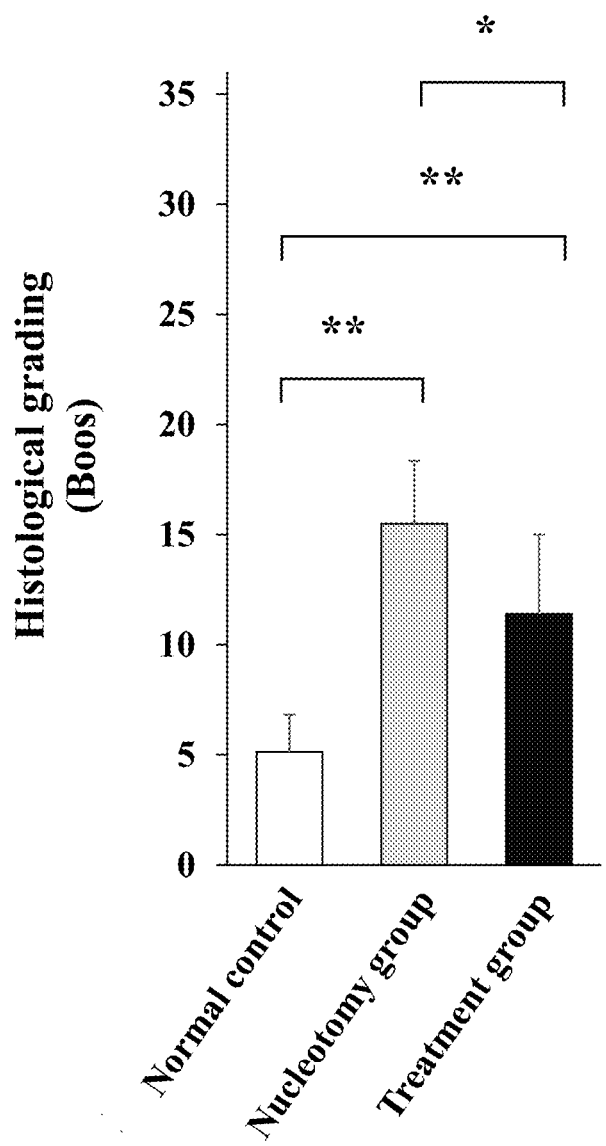

FIG. 8 is a graph showing evaluation results according to modified Boos classification at four weeks after the surgery of the sheep. A normal control group, a nucleotomy group and a treatment group. *P<0.05, **P<0.01.

Figure 9:
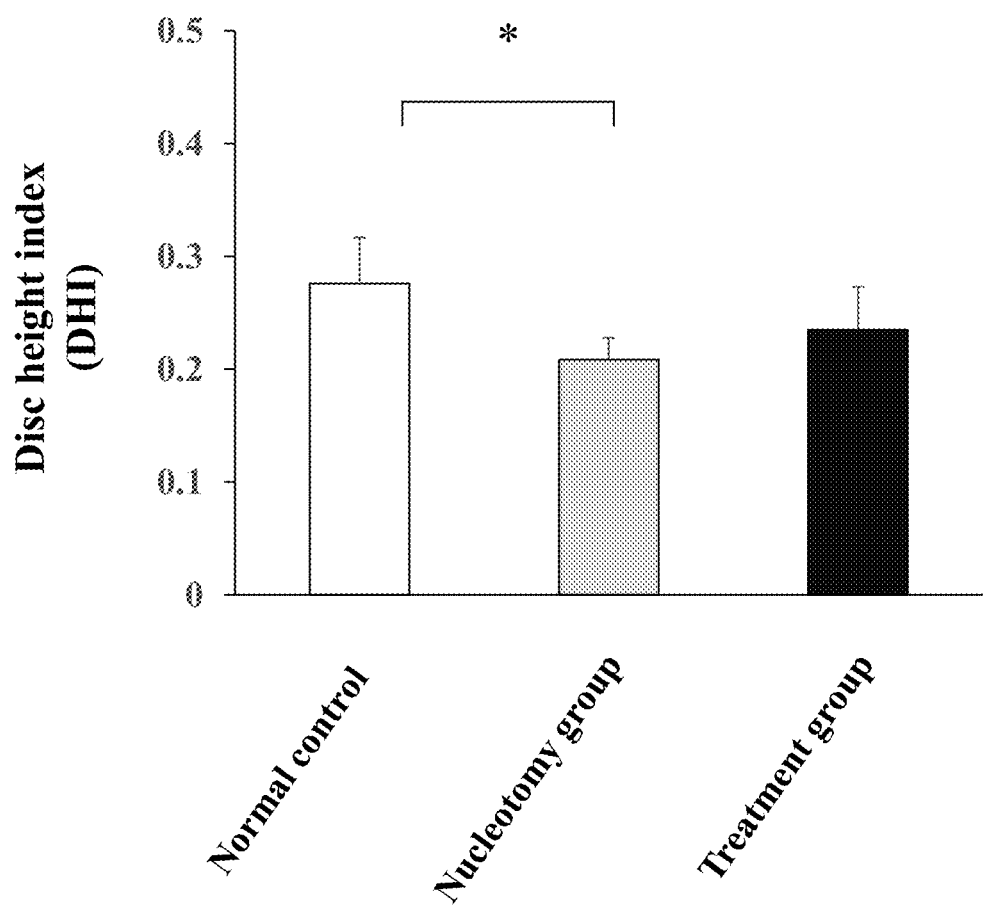

FIG. 9 is a graph showing evaluation results according to the disc height index at four weeks after the surgery of the sheep. A normal control group, a nucleotomy group and a treatment group. *P<0.05.

Figure 10:
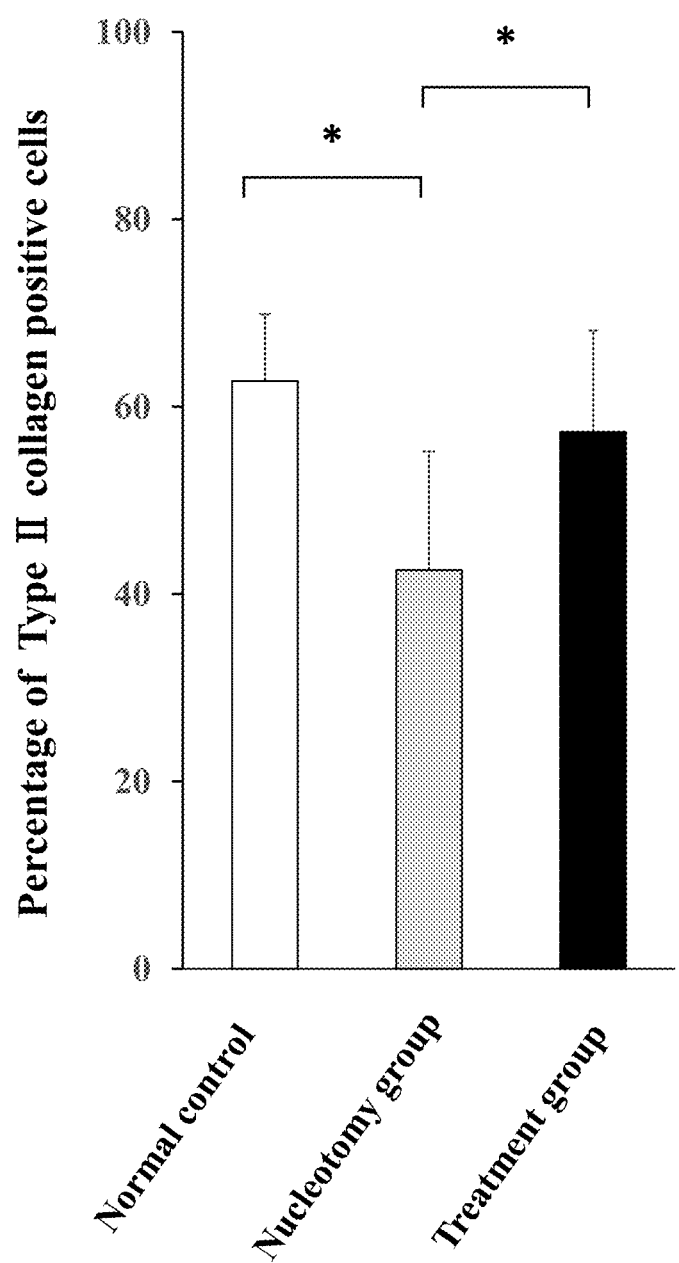

FIG. 10 is a graph showing percentages of anti-Type II collagen antibody-positive cells to the cells in the intervertebral disc tissue sections at four weeks after the surgery of the sheep. A normal control group, a nucleotomy group and a treatment group. *P<0.05.

Figure 11:
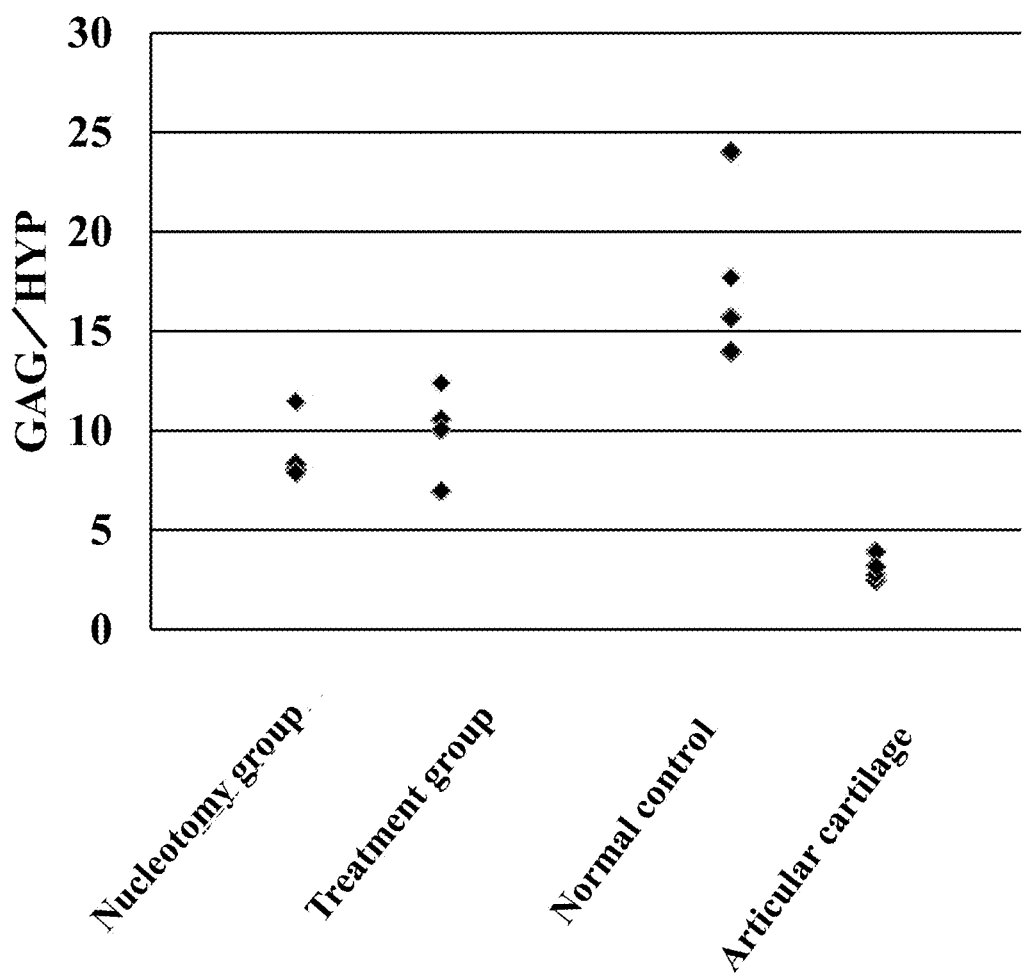

FIG. 11 shows the ratios of sulfated glycosaminoglycan (GAG) to hydroxyproline (HYP) of the nuclei pulposus of the intervertebral discs at four weeks after the surgery. A nucleotomy group, a treatment group, a normal control group and an articular cartilage.

MODES FOR CARRYING OUT THE INVENTION

Hereinafter, the present invention will be described in detail.

1. Composition of the Present Invention

The present invention relates to a composition favorably used for filling a nucleus pulposus of an intervertebral disc.

The composition of the present invention is a composition for filling a nucleus pulposus of an intervertebral disc comprising a low endotoxin monovalent metal salt of alginic acid, which is used by being applied to a nucleus pulposus site of a subject and partially cured after the application and which has fluidity when applied to the nucleus pulposus site (herein, sometimes referred to as a "composition of the present invention").

"Low endotoxin" and "a monovalent metal salt of alginic acid" are as described hereinbelow.

An "intervertebral disc" is a columnar tissue lying between vertebrae forming the vertebral column. An intervertebral disc is a disc-shaped avascular tissue structured to have an annulus fibrosus surrounding a nucleus pulposus at the center and also provided with endplates above and below.

A "nucleus pulposus" is a gel-like tissue located at the center of the intervertebral disc, which mainly contains nucleus pulposus cells, an extracellular matrix mainly composed of proteoglycan and Type II collagen, and water. The nucleus pulposus is considered to have little self-repairing/regenerating capacity.

"Filling of nucleus pulposus" refers to filling of a degenerated part, a shrunken part or a removed part of a degenerated, shrunken or removed nucleus pulposus resulting from aging, trauma, infection, a surgical operation therefor (for example, an intervertebral nucleotomy (resection)) or the like. Herein, the term "replenishment of the nucleus pulposus" is used in the same meaning as "filling of the nucleus pulposus", and a "composition for filling the nucleus pulposus" of the present invention is synonymous with a "composition for replenishing the nucleus pulposus".

A "nucleus pulposus site" refers to a site where a nucleus pulposus exists, a degenerated or shrunken site of a nucleus pulposus, or a defective part of a nucleus pulposus formed by removing at least a part of the nucleus pulposus, and also includes a peripheral part of the site where the nucleus pulposus exists.

A "subject" refers to a human or a living thing other than a human, for example, a bird or a non-human mammal (for example, bovine, monkey, cat, mouse, rat, guinea pig, hamster, pig, dog, rabbit, sheep and horse).

"Application" means to fill a nucleus pulposus site of an intervertebral disc with a composition of the present invention in an amount sufficient to embed a degenerated part, a shrunken part, a removed part, a defective part or the like of the nucleus pulposus site.

The phrase "partially cured" means as described hereinbelow.

The phrase "to contain a low endotoxin monovalent metal salt of alginic acid" means that the composition of the present invention contains a low endotoxin monovalent metal salt of alginic acid in an amount sufficient to regenerate the applied nucleus pulposus site.

The phrase "to have fluidity" means as described hereinbelow.

An "intervertebral disc degeneration and/or intervertebral disc injury", and a "treatment, prevention or suppression of recurrence" mean as described below.

The composition of the present invention may be provided in a solution state using a solvent, or in a dry state as a lyophilizate (particularly, lyophilized powder) or the like. If the composition of the present invention is provided in a dry state, it should be used in a state with fluidity such as a solution state using a solvent upon application. The solvent is not particularly limited as long as it can be applied to a living body, and it may be, for example, injectable water, purified water, distilled water, ion exchange water (or deionized water), Milli-Q water, physiological saline and phosphate buffered physiological saline (PBS). Preferably, it is injectable water, distilled water, physiological saline or the like that can be used for treating a human and an animal.

2. Monovalent Metal Salt of Alginic Acid

The "monovalent metal salt of alginic acid" is a water-soluble salt formed by ion exchange between a hydrogen atom of carboxylic acid at position 6 of alginic acid and a monovalent metal ion such as $Na^+$ or $K^+$. Although specific examples of monovalent metal salts of alginic acid include sodium alginate and potassium alginate, sodium alginate acquirable as a commercially available product is particularly preferable. A solution of a monovalent metal salt of alginic acid forms a gel when mixed with a crosslinking agent.

The "alginic acid" used in the present invention is a biodegradable, high molecular weight polysaccharide that is a polymer obtained by linearly polymerizing two types of uronic acids in the form of D-mannuronic acid (M) and L-gluronic acid (G). More specifically, the alginic acid is a block copolymer in which a homopolymer fraction of D-mannuronic acid (MM fraction), homopolymer fraction of L-gluronic acid (GG fraction) and fraction in which D-mannuronic acid and L-gluronic acid are randomly arranged (MG fraction) are linked arbitrarily. The composite ratio of the D-mannuronic acid to the L-gluronic acid of the alginic acid (M/G ratio) mainly varies according to the type of algae or other organism serving as the origin thereof, is affected by the habitat and season of that organism, and extends over a wide range from a high G type having an M/G ratio of about 0.4 to a high M type having an M/G ratio of about 5.

While a monovalent metal salt of alginic acid is a high molecular weight polysaccharide and it is difficult to accurately determine the molecular weight thereof, it has a weight-average molecular weight generally in a range of 10,000-10,000,000, preferably 20,000-8,000,000 and more preferably 50,000-5,000,000 since too low molecular weight results in low viscosity, by which adhesion to the tissue surrounding the applied site may become weak and too high molecular weight makes the production difficult, lowers solubility, makes handling poor due to too high viscosity in the solution state, makes it difficult to maintain the physical properties during long-term preservation, and the like. Herein, numerical ranges expressed with "-/to" each represent a range that includes the numerical values preceding and following "-/to" as minimum and maximum values, respectively.

Meanwhile, differences in values according to the measurement method are known to occur in the measurement of molecular weights of high molecular weight substances derived from a natural origin. For example, a weight-average molecular weight measured by gel permeation chromatography (GPC) or gel filtration chromatography (which are also collectively referred to as size exclusion chromatography) is preferably 100,000 or more and more preferably 500,000 or more, while preferably 5,000,000 or less and more preferably 3,000,000 or less, according to the effects shown in the examples of the present invention. The preferable range is 100,000-5,000,000, and more preferably 500,000-3,500,000.

Furthermore, an absolute weight-average molecular weight can be measured, for example, by a GPC-MALS method employing a combination of gel permeation chromatography (GPC) and a multi-angle light scattering detector (Multi Angle Light Scattering: MALS). The weight-average molecular weight (absolute molecular weight) measured by the GPC-MALS method is preferably 10,000 or more, more preferably 80,000 or more and still more preferably 90,000 or more, while preferably 1,000,000 or less, more preferably 800,000 or less, still more preferably 700,000 or less and particularly preferably 500,000 or less, according to the effects shown in the examples of the present invention. The preferable range is 10,000-1,000,000, more preferably 80,000-800,000, still more preferably 90,000-700,000, and particularly preferably 90,000-500,000.

When a molecular weight of a high molecular weight polysaccharide is calculated by the process described above, usually, there is normally the potential for measurement error of 10 to 20%. For example, a molecular weight of 400,000 can fluctuate within the range of 320,000 to 480,000, a molecular weight of 500,000 can fluctuate within the range of 400,000 to 600,000, and a molecular weight of 1,000,000 can fluctuate within the range of 800,000 to 1,200,000.

A molecular weight of a monovalent metal salt of alginic acid can be measured according to a common method.

Typical conditions for molecular weight measurement using gel permeation chromatography are as described in the examples herein. For example, GMPW-XL×2+G2500PW-XL (7.8 mm I.D.×300 mm) may be used as the columns, a 200 mM aqueous sodium nitrate solution can be used as the eluent, and pullulan can be used as the molecular weight standard.

Typical conditions for molecular weight measurement using GPC-MALS are as described in the examples herein. For example, a RI detector and a light scattering detector (MALS) can be used as the detectors.

Although a monovalent metal salt of alginic acid has a large molecular weight and relatively high viscosity when originally extracted from brown algae, the molecular weight becomes smaller and the viscosity becomes lower during the course of heat drying, purification and the like. Through management of the conditions such as the temperature during the production, selection of brown alga used for the raw material, processes like molecular weight fractionation during the production and the like, monovalent metal salts of alginic acid with different molecular weights can be produced. Furthermore, it can be mixed with a monovalent metal salt of alginic acid from other lot having different molecular weight or viscosity, so as to give a monovalent metal salt of alginic acid having a molecular weight of interest.

A monovalent metal salt of alginic acid used with the present invention is preferably a solution obtained by dissolving a monovalent metal salt of alginic acid into MilliQ water to a concentration of 1 w/w %, where the apparent viscosity as measured with a cone-plate viscometer under the condition of 20° C. is preferably 40 mPa·s-800 mPa·s and more preferably 50 mPa·s-600 mPa·s. The conditions for measuring the apparent viscosity preferably follow the conditions described hereinbelow. Herein, "apparent viscosity" may simply be referred to as "viscosity".

Although the alginic acid used in the present invention may be of a natural origin or synthetic, it is preferably derived from a natural origin. Examples of naturally-occurring alginic acids include those extracted from brown algae. Although brown algae containing alginic acid are prominently found along seacoasts throughout the world, algae that can actually be used as raw materials of alginic acid are limited, with typical examples thereof including *Lessonia* found in South America, *Macrocystis* found in North America, *Laminaria* and *Ascophyllum* found in Europe, and *Durvillea* found in Australia. Examples of brown algae serving as raw materials of alginic acid include genus *Lessonia*, genus *Macrocystis*, genus *Laminaria*, genus *Ascophyllum*, genus *Durvillea*, genus *Eisenia* and genus *Ecklonia*.

3. Endotoxin Reduction Treatment

The monovalent metal salt of alginic acid used in the present invention is a low endotoxin monovalent metal salt of alginic acid. Low endotoxin refers to that in which the endotoxin level thereof has been substantially lowered to an extent that does not induce inflammation or fever. More preferably, the monovalent metal salt of an alginic acid is preferably subjected to an endotoxin reduction treatment.

Endotoxin reduction treatment can be carried out by a known method or a method complying therewith. For example, this treatment can be carried out by the method of Suga et al. involving purification of sodium hyaluronate (see, for example, Japanese Patent Application Laid-open No. H9-324001), the method of Yoshida et al. involving purification of β1,3-glucan (see, for example, Japanese Patent Application Laid-open No. H8-269102), the method of William et al. involving purification of a biopolymer such as alginate or gellan gum (see, for example, Published Japanese Translation No. 2002-530440 of PCT International Publication), the method of James et al. involving purification of polysaccharide (see, for example, International Publication No. 93/13136 pamphlet), the method of Lewis et al. (see, for example, U.S. Pat. No. 5,589,591), the method of Hermanfranck et al. involving purification of alginate (see, for example, Appl. Microbiol. Biotechnol. (1994), 40:638-643) or a method complying therewith. The endotoxin reduction treatment of the present invention is not limited thereto, but rather can be carried out by a known method such as cleaning, purification using filtration with filter (endotoxin removing filter or electrification filter), ultrafiltration or a column (such as an endotoxin adsorption affinity column, gel filtration column or ion exchange column), adsorption to a hydrophobic substance, resin or activated carbon and the like, organic solvent treatment (such as extraction with an organic solvent or precipitation or deposition by addition of organic solvent), surfactant treatment (see, for example, Japanese Patent Application Laid-open No. 2005-036036) or a suitable combination thereof. A known method such as centrifugal separation may be suitably combined with these treatment steps. Endotoxin reduction treatment is preferably suitably selected according to the type of alginic acid.

The endotoxin level can be confirmed by a known method, and can be measured using a known method such as a method using Limulus reagent (LAL) or Endospecy (registered trademark) ES-24S set (Seikagaku Corporation).

Although there are no particular limitations on the endotoxin treatment method of the alginic acid contained in the composition of the present invention, the endotoxin content of the monovalent metal salt of alginic acid in the case of measuring endotoxin using a limulus reagent (LAL) is preferably 500 endotoxin units (EU)/g or less, more preferably 100 EU/g or less, even more preferably 50 EU/g or less and particularly preferably 30 EU/g or less as a result thereof. Sodium alginate that has undergone endotoxin reduction treatment can be acquired as a commercially available products such as Sea Matrix (registered trademark) (Mochida Pharmaceutical), PRONOVA™ UP LVG (FMC BioPolymer) or the like.

4. Preparation of Solution of Monovalent Metal Salt of Alginic Acid

The composition of the present invention may be prepared by using a solution of a monovalent metal salt of alginic acid. The solution of a monovalent metal salt of alginic acid can be prepared by a known method or method complying therewith. Namely, the monovalent metal salt of alginic acid used in the present invention can be produced by a known method such as an acid method or calcium method using the previously described brown algae. More specifically, after extracting from these brown algae using an alkaline aqueous solution such as aqueous sodium carbonate solution, for example, alginic acid be obtained by adding an acid (such as hydrochloric acid or sulfuric acid), and a salt of alginic acid can be obtained by ion exchange of the alginic acid. Endotoxin reduction treatment is then carried out as previously described. There are no particular limitations on the solvent of the monovalent metal salt of alginic acid provided it is a solvent that can be applied in vivo, and examples of such solvents include purified water, distilled water, ion exchange water, Milli-Q water, physiological saline and phosphate-buffered saline (PBS). These are preferably sterilized and preferably subjected to endotoxin reduction treatment. For example, Milli-Q water can be used after sterilizing by filtration.

When the composition of the present invention is provided in a dry state as a lyophilizate or the like, the above-described solvent can be used to prepare it into a solution having fluidity.

Moreover, all of the operations for obtaining the composition of the present invention are preferably carried out in an environment at a low endotoxin level and a low bacterial level. For example, the operations are preferably carried out in a clean bench using sterilized tools. The tools used may be treated with a commercially available endotoxin removal agent.

5. Apparent Viscosity of Composition of the Present Invention

Compositions in some aspects of the present invention are in a liquid state having fluidity, namely, a solution state. The composition of the present invention has fluidity when applied to the nucleus pulposus site. In one aspect of the present invention, the composition of the present invention preferably has fluidity that allows injection with a 21G needle following an hour of standing at 20° C. While the apparent viscosity of the composition of the present invention in this aspect is not particularly limited as long as the effect of the present invention can be achieved, it is preferably 10 mPa·s or more, more preferably 100 mPa·s or more, still more preferably 200 mPa·s or more and particularly preferably 500 mPa·s or more since too low viscosity would weaken adhesion to the tissue surrounding the applied site. It is also preferably 50,000 mPa·s or less, more preferably 20,000 mPa·s or less and still more preferably 10,000 mPa·s or less since too high apparent viscosity would deteriorate the handing property. An apparent viscosity of 20,000 mPa·s or less would facilitate application with a syringe or the like. Application, however, is also possible even if the apparent viscosity is 20,000 mPa·s or more by using a pressurized or electric filling tool or other means. The composition of the present invention is preferably in a range of 10 mPa·s-50,000 mPa·s, more preferably 100 mPa·s-30,000 mPa·s, still more preferably 200 mPa·s-20,000 mPa·s, yet still more preferably 500 mPa·s-20,000 mPa·s, and particularly preferably 700 mPa·s-20,000 mPa·s. In another preferable aspect, it may be 500 mPa·s-10,000 mPa·s, or 2000 mPa·s-10,000 mPa·s. Compositions in some aspects of the present invention have viscosity that also allows application to a subject with a syringe or the like.

The apparent viscosity of a composition containing a monovalent metal salt of alginic acid, for example, an aqueous solution of alginic acid, can be measured according to a common method. For example, a coaxial double cylinder type rotational viscometer, a single cylinder type rotational viscometer (Brookfield viscometer), a cone-plate rotational viscometer (a cone-plate viscometer) or the like can be used for the measurement according to a rotational viscometer method. It is preferable to follow the viscosity measurement method of the Japanese Pharmacopoeia (16th edition). According to the present invention, the viscosity measurement is preferably carried out under the condition of 20° C. As will be described below, if the composition of the present invention contains anything that cannot be dissolved in the solvent such as cells, the apparent viscosity of the composition is preferably an apparent viscosity free of cells or the like in order to carry out an accurate viscosity measurement.

According to the present invention, an apparent viscosity of a composition containing a monovalent metal salt of alginic acid is particularly measured with a cone-plate viscometer. For example, a measurement preferably takes place under the following measurement conditions. A sample solution is prepared with MilliQ water. The measurement temperature is 20° C. The rotation speed of the cone-plate viscometer is 1 rpm for measuring a 1% solution of the monovalent metal salt of alginic acid, 0.5 rpm for measuring a 2% solution, which can be determined so on. For the 1% solution of the monovalent metal salt of alginic acid, the reading time is 2 minutes of measurement to obtain the average of the values taken during the period from 1 to 2 minutes after the start of such measurement; and for the 2% solution, the reading time is 2.5 minutes of measurement to obtain the average of the values taken during the period from 0.5 to 2.5 minutes after the start of such measurement. The test value is an average value of three times of measurements.

The apparent viscosity of the composition of the present invention can be adjusted, for example, by controlling the concentration, the molecular weight, the M/G ratio or the like of the monovalent metal salt of alginic acid.

The apparent viscosity of the monovalent metal salt solution of alginic acid becomes high when the concentration of the monovalent metal salt of alginic acid in the solution is high whereas the viscosity becomes low when the concentration is low. Moreover, the viscosity becomes higher when the molecular weight of the monovalent metal salt of alginic acid is large whereas the viscosity becomes lower when the molecular weight is small.

Since an apparent viscosity of a monovalent metal salt solution of alginic acid is affected by the M/G ratio, for example, an alginic acid can be suitably selected that has an M/G ratio more preferable for viscosity of the solution or the like. The M/G ratio of the alginic acid used with the present invention is about 0.1-5.0, preferably about 0.1-4.0 and more preferably about 0.2-3.5.

As described above, since the M/G ratio is mainly determined by the species of the seaweed, the species of the brown alga used as the raw material affects the viscosity of the monovalent metal salt solution of alginic acid. The alginic acid used with the present invention is preferably derived from a brown alga of genus *Lessonia*, genus *Macrycystis*, genus *Laminaria*, genus *Ascophyllum* and genus *Durvillea*, more preferably from a brown alga of genus *Lessonia*, and particularly preferably derived from *Lessonia nigrescens*.

6. Preparation of Composition of the Present Invention

The composition of the present invention is characterized by containing a low endotoxin monovalent metal salt of alginic acid as an active ingredient. The present inventors found for the first time that when a low endotoxin monovalent metal salt of alginic acid is used to fill a nucleus pulposus site of a living body, the monovalent metal salt of alginic acid per se exerts an effect to regenerate or treat the nucleus pulposus tissue. "Contained as an active ingredient" means that the low endotoxin monovalent metal salt of alginic acid is contained in an amount effective to regenerate or treat the nucleus pulposus tissue when it is applied to the affected site, which is at least, preferably 0.1 w/v % or more, more preferably 0.5 w/v % or more and still more preferably 1 w/v % of the whole composition. Although a preferable concentration of the monovalent metal salt of alginic acid in the composition of the present invention cannot be determined unconditionally because it is affected by the molecular weight, it is preferably 0.5 w/v %-5 w/v %, more preferably 1 w/v %-5 w/v %, still more preferably 1 w/v %-3 w/v % and particularly preferably 1.5 w/v %-2.5 w/v %. Moreover, in another aspect, the concentration of the monovalent metal salt of alginic acid in the composition of the present invention may be preferably 0.5 w/w %-5 w/w %, more preferably 1 w/w %-5 w/w %, still more preferably 1 w/w %-3 w/w % and particularly preferably 1.5 w/w %-2.5 w/w %.

When a monovalent metal salt of alginic acid that is purified to a preferable endotoxin level is used to produce a composition as described above, the endotoxin content of the composition is usually 500 EU/g or less, more preferably 300 EU/g or less, still more preferably 150 EU/g or less and particularly preferably 100 EU/g or less.

The composition of the present invention is preferably free of cells.

Compositions in some of other aspects of the present invention use cells.

Examples of cells include nucleus pulposus cells, stem cells, stromal cells, mesenchymal stem cells and marrow stromal cells. While their sources are not particularly limited, examples include a nucleus pulposus of an intervertebral disc, a bone marrow, an adipose tissue and an umbilical cord blood. The cells also include ES and iPS cells.

The phrase "to use cells" refers to addition of cells to the composition of the present invention, wherein the cells are prepared, as may be necessary, by a process in which cells of interest are collected and concentrated from a nucleus pulposus of an intervertebral disc, a bone marrow, an adipose tissue, an umbilical cord blood or the like, or a process where the cells are cultured to increase the amount thereof. Specifically, the cells are contained in the composition of the present invention, for example, for $1 \times 10^4$ cells/ml or more, $1 \times 10^5$ cells/ml or more, preferably $1 \times 10^4$ cells/ml to $1 \times 10^7$ cells/ml. The cells may be commercially available.

The composition of the present invention may also contain a factor for promoting the growth of the cells. Examples of such a factor include BMP, FGF, VEGF, HGF, TGF-β, IGF-1, PDGF, CDMP (cartilage-derived-morphogenetic protein), CSF, EPO, IL, PRP (Platelet Rich Plasma), SOX and IF. These factors can be produced by a recombination method or may be purified from a protein composition. Here, compositions of some aspects of the present invention do not contain thesegrowth factors. Even in the case of not containing growth factor, however, regeneration of the nucleus pulposus is adequately satisfactory, and safety is higher than in the case of aggressively promoting cell growth.

The composition of the present invention may contain factors for suppressing cell death. Examples of a factor that induces cell death include Caspase and TNFα, and examples of a factor for suppressing them include an antibody and siRNA. Suchfactors for suppressing cell death may be produced by a recombination method or may be purified from a protein composition. Here, compositions in some aspects of the present invention do not contain such factors for suppressing cell death. Even in the case of not containing factors for suppressing cell death, however, regeneration of the nucleus pulposus is adequately satisfactory, and safety is higher than in the case of aggressively supressing cell death.

Furthermore, in one aspect of the present invention, the composition of the present invention does not contain a component demonstrating pharmacological action on a nucleus pulposus tissue of an intervertebral disc other than a low endotoxin monovalent metal salt of alginic acid. A composition containing as an active ingredient thereof only a low endotoxin monovalent metal salt of alginic acid is also able to demonstrate adequate effects for regenerating or treating a nucleus pulposus.

In some aspects of the present invention, the composition of the present invention can also contain components ordinarily used in pharmaceuticals, such as other pharmaceutically active ingredients and commonly used stabilizers, emulsifiers, osmotic pressure adjusters, buffers, isotonic agents, preservatives, pain relievers or colorants as necessary.

7. Curing of Composition of the Present Invention

The composition of the present invention is used such that it is partially cured after being applied to the nucleus pulposus site.

"Partially cured" means to bring a crosslinking agent into contact with a part of the composition of the present invention having fluidity so as to gel and solidify not the whole but a part of the composition in contact with the crosslinking agent. Preferably, the crosslinking agent is brought into contact with at least a part of the surface of the composition of the present invention having fluidity so as to cure a part of the composition of the present invention. In some aspects of the present invention, "the composition is partially cured after being applied to the nucleus pulposus site" means that at least 50% of the volume of the composition in a 6 mm diameter test tube is not gelled when the test tube is filled with 500 µL of a low endotoxin sodium alginate and a crosslinking agent by employing the same method and ratio for using the crosslinking agent as those employed for filling in the nucleus pulposus site, and leaving the resultant to stand for an hour in vitro according to Example 4 of the present specification, where the ungelled part may be represented by suction of at least 50% of the volume of the composition in the test tube using a syringe with a 21G needle. As long as the composition shows such property after being filled into the nucleus pulposus site, it is considered that the composition would not deviate therefrom even when compression force is applied from the head and tail sides of the intervertebral disc after the filling. "At least a part of the surface of the composition" refers to, for example, an opening in the surface of the intervertebral disc that leads to the nucleus pulposus, preferably, an opening in the surface of the intervertebral disc that is used for applying the composition to the nucleus pulposus site, namely, an inlet for filling in the composition. Solidification of at least a part of the surface of the composition by gelation can effectively prevent leakage of the composition from the intervertebral disc. An composition-filling inlet on the surface of the intervertebral disc is, for example, preferably an opening formed in the surface of the intervertebral disc with a needle of a syringe or a scalpel for filling in the composition, or an opening in the surface of the intervertebral disc formed with a scalpel or the like upon resection of the herniated disc. In this aspect, an intervertebral disc preferably refers to an annulus fibrosus.

Preferably, the composition of the present invention does not contain a crosslinking agent in an amount that results curing of the composition before application to a nucleus pulposus site of a subject. Therefore, the composition of the present invention may contain a crosslinking agent in an amount that does not result curing of the composition even after a certain period of time. Herein, a certain period of time refers to, but not particularly limited to, preferably about 30 minutes to 12 hours. The phrase "does not contain a crosslinking agent in an amount that results curing of the composition" may be represented, for example, by the composition being injectable with a syringe with a 21G needle after standing at 20° C. for an hour. Compositions in some aspects of the present invention are free of a crosslinking agent.

There are no particular limitations on the crosslinking agent provided it is able to solidify a surface of a solution of a monovalent metal salt of alginic acid by crosslinking that solution. Examples of the crosslinking agent include divalent or more metal ion compounds such as $Ca^{2+}$, $Mg^{2+}$, $Ba^{2+}$ and $Sr^{2+}$, and crosslinking reagents having 2 to 4 amino groups in a molecule thereof. Specific examples of divalent or more metal ion compounds include $CaCl_2$, $MgCl_2$, $CaSO_4$, $BaCl_2$, while specific examples of crosslinking reagents having 2 to 4 amino groups in a molecule thereof include diaminoalkanes optionally having a lysyl group ($—COCH(NH_2)—(CH_2)_4—NH_2$) on a nitrogen atom, namely derivatives which form lysylamino groups as a result of a diaminoalkane and amino group thereof being substituted with a lysyl group. Although specific examples thereof include diaminoethane, diaminopropane and N-(lysyl)-diaminoethane, $CaCl_2$ solution is particularly preferable for reasons such as ease of acquisition and gel strength.

In one of some aspects of the present invention, the timing of bringing the crosslinking agent into contact with the surface of the composition of the present invention is preferably after the application of the composition of the present invention to the nucleus pulposus site. A method for bringing a crosslinking agent (for example, a divalent or higher valent metal ion) into contact with a part of the composition of the present invention is not particularly limited and may be, for example, a method in which a solution of the divalent or higher valent metal ion is applied to the surface of the composition with a syringe, a spray or the like. For example, a crosslinking agent may continuously and slowly be applied onto the composition-filling inlet formed in the intervertebral disc by spending several seconds to more than 10 seconds. Thereafter, if necessary, a treatment for removing the crosslinking agent remaining in the vicinity of the filling inlet may be added. The crosslinking agent may be removed, for example, by washing the applied part with a physiological saline or the like.

Preferably, the amount of the crosslinking agent used is appropriately adjusted considering the amount of the composition of the present invention applied, the size of the inlet in the surface of the intervertebral disc for filling the composition, the size of the site of the nucleus pulposus of the intervertebral disc to be applied, and the like. In order not to strongly affect the tissue surrounding the composition-filling inlet with the crosslinking agent, the amount of the crosslinking agent used is controlled not to be too much. The amount of the divalent or higher valent metal ion used is not particularly limited as long as the surface of the composition containing the monovalent metal salt of an alginic acid can be solidified. When, for example, a 100 mM $CaCl_2$ solution is used, the amount of the $CaCl_2$ solution used is preferably about 0.3 ml-5.0 ml, and more preferably about 0.5 ml-3.0 ml if the diameter of the filling inlet in the surface of the intervertebral disc is about 1 mm. When the filling inlet in the surface of the intervertebral disc is formed with a scalpel or the like upon resection of the herniated disc with the edges of about 5 mm×10 mm, the amount of the 100 mM $CaCl_2$ solution used is preferably about 0.3 ml-10 ml and more preferably about 0.5 ml-6.0 ml. The amount can suitably be increased or decreased while observing the state of the composition of the present invention at the applied site.

In the case calcium is contained in the crosslinking agent, a higher calcium concentration is known to result in rapid gelation and the formation of a harder gel. However, since calcium has cytotoxicity, if the concentration is too high, it may have a risk of adversely affecting the action of the composition of the present invention to regenerate the nucleus pulposus of an intervertebral disc. Therefore, in the case of using a $CaCl_2$ solution to solidify the surface of a composition containing a monovalent metal salt of alginic acid, for example, the calcium concentration is preferably set to 25 mM-200 mM and more preferably 50 mM-150 mM.

According to the present invention, preferably, the crosslinking agent remaining at the added site after adding the crosslinking agent to the composition and leaving the resultant to stand for a certain period of time, is preferably removed by washing or the like. While the certain period of time for leaving the composition to stand is not particularly limited, it is preferably left to stand for about a minute or longer and more preferably about 4 minutes or longer so as to gel the surface of the composition. Alternatively, it is preferably left to stand for about 1-10 minutes, more preferably about 4-10 minutes, about 4-7 minutes and still more preferably about 5 minutes. The composition and the crosslinking agent are preferably in contact during this certain period of time, and a crosslinking agent may appropriately be added so that the liquid surface of the composition does not dry.

For example, alginate beads can be obtained by dropping a sodium alginate solution into a $CaCl_2$ solution to form gel. The alinate beads, however, need to be applied by being pressed to the site to be applied and those having a size appropriate for the applied site are required, which is technically difficult in an actual clinical practice. Moreover, when a $CaCl_2$ solution is used as a crosslinking agent, the Ca ion on the bead surface makes contact with the surrounding tissue, causing a problem of calcium cytotoxicity. On the other hand, the composition of the present invention in a solution state can easily be applied to sites having any kind of shape and can cover the whole area of the site to be applied with good adhesion to the surrounding tissue. The calcium concentration of the part of the composition of the present invention making contact with the surrounding tissue can be kept low and thus the problem of calcium cytotoxicity is little. Since the part of the composition of the present invention making contact with the surrounding tissue is less affected by the crosslinking agent, the composition of the present invention can easily make contact with the cells and the tissue of the site to be applied. Preferably, the composition of the present invention fuses with the tissue of the living body at the applied site to an unnoticeable level in about 4 weeks after the application to the nucleus pulposus site, with high affinity to the living body.

When a part of the composition of the present invention is gelled with the crosslinking agent upon applying the composition of the present invention to the nucleus pulposus site, the composition of the present invention is cured at a part of the affected site and localized thereat in the state of being adhered to the surrounding tissue, thereby preventing leakage from the nucleus pulposus site. In addition, as a result of adhering the composition of the present invention to the surrounding tissue, the nucleus pulposus regeneration effects of the composition of the present invention can be demonstrated more potently.

When the filling material applying to the nucleus pulposus site was entirely gelled and cured as a comparative example in the examples of the present invention, a phenomenon where the cured gel deviated from the composition filling inlet on the surface of the intervertebral disc was observed when compression force was placed on the intervertebral disc from the head and tail sides. On the other hand, when the composition of the present invention in a solution state was used to fill the nucleus pulposus site, there was no deviation from the filling inlet in the surface of the intervertebral disc even when compression force was placed from the head and tail sides. Specifically, the risk of the filling composition to leak out is little even against compression to the intervertebral disc from the vertical direction when the composition of the present invention is actually used for filling the nucleus pulposus.

Furthermore, when a cured gel fills the nucleus pulposus site, the cured gel may have a risk of protruding into the spinal canal, which may cause serious neuropathy. On the other hand, the composition of the present invention in a solution state is hardly associated with such a risk with little risk of onset of complications.

8. Application of Composition of the Present Invention

The composition of the present invention can be applied to a nucleus pulposus site of an intervertebral disc of a human or an organism other than a human, for example, a bird or a non-human mammal (for example, bovine, monkey, cat, mouse, rat, guinea pig, hamster, pig, dog, rabbit, sheep or horse) to promote regeneration of the nucleus pulposus thereof.

The composition of the present invention is preferably in a liquid state having fluidity, namely, in a solution state. In the present invention, the phrase "having fluidity" refers to the having of a property that causes the form thereof to change to an amorphous form, and does not require that the form constantly have the property of flowing in the manner of a liquid, for example. Preferably, it has fluidity that allows the composition to be sealed in a syringe and injected into a nucleus pulposus site of an intervertebral disc. Furthermore, in one of some aspects of the present invention, the composition preferably has fluidity to be injected into a nucleus pulposus site of an intervertebral disc with a syringe with a 14G-26G needle, more preferably a 21G needle, after being left to stand at 20° C. for an hour. When the composition of the present invention is provided in a dry state as a lyophilizate or the like, it can be made into a composition to have the above-described fluidity with a solvent or the like upon application.

The composition of the present invention in a solution state can easily be applied to a nucleus pulposus site of an intervertebral disc with a syringe, a pipette for gel, a specialized syringe, a specialized injector, a filling tool or the like.

Since application with a syringe is difficult when the viscosity of the composition of the present invention is high, a pressurized or electric syringe or the like may be used. Even without a syringe or the like, application to a defective part of the nucleus pulposus can be carried out, for example, with a spatula, a stick or the like. When a syringe is used for injection, for example, a 14G-27G or 14G-26G needle is preferably used.

While the method for applying the composition of the present invention to the nucleus pulposus site is not particularly limited, the composition of the present invention is preferably applied to the nucleus pulposus site by using a syringe, a filling tool or the like after exposing the affected site by a known surgical process under direct vision, or under a microscope or an endoscope. In one preferable aspect, a needle of a filling tool or the like can be inserted from the surface of the annulus fibrosus toward the nucleus pulposus site to apply the composition of the present invention.

Since the composition of the present invention is in a solution state, it can suit a nucleus pulposus site with any shape including shrinkage of the nucleus pulposus and a cavity or a defective part of the nucleus pulposus site such that it can fill the entire shrinkage, cavity or defective part. The shrinkage of the nucleus pulposus and the cavity and the defective part of the nucleus pulposus site may result from degeneration or injury of the intervertebral disc or upon removal or suction of at least a part of the nucleus pulposus by a surgical operation. Preferably, the composition of the present invention is applied to a nucleus pulposus defective part that is formed by removing at least a part of the nucleus pulposus.

While the removal of at least a part of the nucleus pulposus is not particularly limited, it may, for example, be an intervertebral nucleotomy or the like performed under direct vision, transdermally, under microscopic vision or endoscopically. Alternatively, it may be, for example, a method in which an incision of 2 cm-10 cm is made in the back to remove the muscle from the rear surface of the posterior element of the vertebral column called a vertebral arch to resect the ligament between the vertebral arches, confirm the nerve and disc herniation, and excise the hernia pressurizing the nerve (Love's method). Alternatively, the method may be one in which the nucleus pulposus is irradiated with laser to reduce the volume of the nucleus pulposus.

After the application of the composition of the present invention to the nucleus pulposus, the composition can partially be cured with a crosslinking agent as described above.

While the amount of the composition of the present invention applied is not particularly limited and can be determined according to the volume of the applied site of the nucleus pulposus of the subject to be applied, it may, for example, be 0.01 ml-10 ml, more preferably, 0.1 ml-5 ml and still more preferably 0.2 ml-3 ml. When the composition of the present invention is applied to the nucleus pulposus defective part, it is preferably injected so as to sufficiently fill the volume of the defective part of the nucleus pulposus.

The number of times and the frequency of the application of the composition of the present invention can be increased or decreased according to the symptoms and the effect. For example, it may be a single application, or regular application once in a month to a year.

Since an alginic acid does not naturally exist in the bodies of animals, animals do not possess an enzyme to specifically degrade the alginic acid. While an alginic acid can be gradually degraded in an animal body due to general hydrolysis, its degradation in the body is milder as compared to a polymer such as hyaluronic acid. In addition, since no blood vessel exists in the nucleus pulposus, the effect of the alginic acid is expected to last long when filled inside the nucleus pulposus.

Even when the composition of the present invention is provided without the above-described cells or growth factors, the composition of the present invention may be used in combination with the above-described cells, growth factors, cell death suppressing factors, and other drugs mentioned below upon application to the nucleus pulposus site.

The composition of the present invention exerts the effects of suppressing degenerative changes in the whole tissue of the intervertebral disc and the nucleus pulposus and promoting regeneration by being applied to the nucleus pulposus site. Therefore, the composition of the present invention can favorably be used as a composition for filling a nucleus pulposus of an intervertebral disc.

One of the preferable aspects of the composition of the present invention is a composition for suppressing degeneration of an intervertebral disc, and more preferably a composition for suppressing degeneration of an nucleus pulposus of an intervertebral disc. "Degeneration of an intervertebral disc or a nucleus pulposus" means that the cell number, the water content, the extracellular matrix (Type II collagen, aggrecan, etc.) and the like of an intervertebral disc are decreased due to aging or the like to result morphological changes and dysfunction, and, if they progress, the intervertebral disc can no longer perform a function as a shock absorber. In the present description, "suppression of degeneration" is not necessarily required to result in a state with no degeneration, but rather may result in that the degenerative change is suppressed as compared to an untreated case.

One aspect of the composition of the present invention is a composition for regenerating a nucleus pulposus. Regeneration of a nucleus pulposus aims at preventing accumulation of fibroblast-like cells to regenerate a nucleus pulposus with a high nucleus pulposus cell ratio, and intends to regenerate a nucleus pulposus tissue rich in Type II collagen and proteoglycan. The term regeneration of a nucleus pulposus also comprises to suppress degeneration of the nucleus pulposus. In one preferable aspect of the present invention, the composition making up the nucleus pulposus regenerated by applying the composition of the present invention is preferably close to the composition making up a natural normal nucleus pulposus.

Moreover, the composition of the preferable aspect of the present invention can be used for treating, preventing or suppressing recurrence of an intervertebral disc degeneration and/or an intervertebral disc injury. Herein, "treatment, prevention or suppression of recurrence" comprise treatment, prevention, suppression of recurrence, reduction, suppression, improvement, removal, reduction in onset rate, delay of onset, suppression of progress, alleviation of severity, reduction in recurrence rate, delay of recurrence, alleviation of clinical symptoms and the like.

Preferable aspects of these compositions of the present invention, and a method of using them are as described above.

An intervertebral disc degeneration and/or an intervertebral disc injury is, for example, at least one condition or disease selected from the group consisting of disc herniation, discopathy, degenerative spondylolisthesis, pyogenic discitis, spondylosis deformans, spinal canal stenosis and an intervertebral disc injury.

9. Therapeutic Method

The present invention provides a method for treating, preventing or suppressing recurrence of an intervertebral disc degeneration and/or an intervertebral disc injury by using the above-described composition of the present invention. Preferably, a therapeutic method of the present invention is a method for treating, preventing or suppressing recurrence of an intervertebral disc degeneration and/or an intervertebral disc injury, the method comprising applying a composition having fluidity comprising a low endotoxin monovalent metal salt of alginic acid to a nucleus pulposus site of an intervertebral disc of a subject in need of such treatment, prevention or suppression of recurrence, and partially curing the applied composition.

The therapeutic method of the present invention may comprise a step of removing at least a part of the nucleus pulposus before applying the composition of the present invention to the nucleus pulposus site.

The intervertebral disc degeneration and/or the intervertebral disc injury is, for example, at least one condition or disease selected from the group consisting of disc herniation, discopathy, degenerative spondylolisthesis, pyogenic discitis, spondylosis deformans, spinal canal stenosis and an intervertebral disc injury. According to therapeutic methods in some aspects of the present invention, the intervertebral disc degeneration and/or the intervertebral disc injury is disc herniation, and particularly lumbar disc herniation.

Moreover, in one of some aspects of the present invention, a method for suppressing degenerative change in an intervertebral disc by using the above-described composition of the present invention is provided. In one preferable aspect of the present invention, a method for regenerating a nucleus pulposus of an intervertebral disc by using the above-described composition of the present invention is provided.

These methods comprise applying a composition containing a low endotoxin monovalent metal salt of alginic acid and having fluidity to a nucleus pulposus site of an intervertebral disc of a subject in need of suppressing intervertebral disc degeneration or in need of regenerating a nucleus pulposus regeneration, and partially curing the applied composition. The above-described method may comprise a step of removing at least a part of the nucleus pulposus before applying the composition of the present invention to the nucleus pulposus site.

Preferable aspects of the composition of the present invention, a specific method for applying it to the nucleus pulposus of the intervertebral disc, a method for curing the composition, meaning of the terms, and else are as described above. The therapeutic method of the present invention can be carried out by suitably combining with other methods or drugs for treating an intervertebral disc.

Furthermore, a co-administered drug, for example, an antibiotic such as streptomycin, penicillin, tobramycin, amikacin, gentamycin, neomycin or amphotericin B, an anti-inflammatory agent such as aspirin, a non-steroidal anti-inflammatory drug (NSAID) or acetaminophen, a proteinase, a corticosteroid drug or a HMG-CoA reductase inhibitor such as simvastatin or lovastatin can be filled before, simultaneous to or after application of the the composition of the present invention to the nucleus pulposus site. These drugs may also be used in a mixing into the composition of the present invention. Alternatively, they may be administered orally or parenterally for co-administration. In addition, if necessary, a muscle relaxant, an opioid analgesic, a neurogenic pain alleviating drug or the like may be administered orally or parenterally for co-administration.

Moreover, in some aspects of the present invention, the above-described cells can be applied to the nucleus pulposus site together with the composition of the present invention. Alternatively, in some aspects of the present invention, a factor for promoting the growth of such cells can be applied to the nucleus pulposus site together with the composition of the present invention. In another favorable aspect of the present invention, the composition of the present invention is not combined with the above-described cells. Alternatively, in another favorable aspect, the composition of the present invention is not combined with a factor for promoting the growth of the cells. The composition of the present invention can promote the regeneration of a nucleus pulposus even without using such cells or factors.

The present invention also relates to use of a low endotoxin monovalent metal salt of alginic acid for manufacturing a composition of the present invention.

Use of the present invention is use of a low endotoxin monovalent metal salt of alginic acid for manufacturing a composition for treating, preventing or suppressing recurrence of an intervertebral disc degeneration and/or an intervertebral disc injury, wherein the composition is applied to a nucleus pulposus site of a subject and a part thereof is cured after the application, and the composition has fluidity when applied to the nucleus pulposus site.

The present invention further provides a low endotoxin monovalent metal salt of alginic acid to be used for treating, preventing or suppressing recurrence of an intervertebral disc degeneration and/or an intervertebral disc injury, wherein a composition comprising the low endotoxin monovalent metal salt of alginic acid and having fluidity is applied to a nucleus pulposus site of an intervertebral disc of a subject in need of treatment, prevention or suppression of recurrence of the intervertebral disc degeneration and/or the intervertebral disc injury, and the applied composition is partially cured.

10. Lyophilized Preparation and Kit

The present invention provides a kit for filling a nucleus pulposus of an intervertebral disc.

The kit of the present invention can comprise a composition of the present invention. The composition of the present invention contained in the kit of the present invention is in a solution state or a dry state, preferably in a dry state, more preferably a lyophilizate, and particularly preferably lyophilized powder. When the composition of the present invention is in a dry state, the kit preferably contains a dissolving solvent (for example, injectable water).

The kit of the present invention may further comprise a crosslinking agent.

The kit of the present invention may further comprise a crosslinking agent, a syringe, a needle, a pipette for gel, a specialized filling unit, instructions and the like.

A specific examples of a preferable kit is a kit comprising (1) a vial in which a lyophilizate of a low endotoxin sodium alginate is sealed, (2) an ampule in which a solvent such as injectable water as a dissolving liquid is sealed, (3) an ampule in which a divalent or higher valent metal ion compound such as a calcium chloride solution as a crosslinking agent is sealed, and the like, in a single pack. In another example of a kit is that in which a monovalent metal salt of alginic acid is sealed in one compartment of a syringe composed of two integrally formed compartments divided by a partition, and a solvent as a dissolving liquid or a solution containing a crosslinking agent is sealed in the other compartment, and is composed such that the partition between the compartments can be penetrated easily at the time of use to enable the contents of both compartments to be used by mixing and dissolving at the time of use. Another example of a kit is that a monovalent metal salt solution of alginic acid is sealed in a pre-filled syringe allowing it to be administered directly at the time of use without requiring a preparation procedure. Another example is a kit in which an alginic acid solution and a crosslinking agent are sealed in separate syringes and packaged together in a single pack. Alternatively, it may be a kit comprising a vial filled with a monovalent metal salt solution of alginic acid, an ampule in which a crosslinking agent is sealed, and the like. The "composition of the present invention", the "crosslinking agent", the "syringe" and the like are as described above.

The kit of the present invention can, for example, be used in a therapeutic method of the present invention.

All documents and publications cited herein are incorporated herein by reference in their entirety regardless of their purposes. In addition, the present specification incorporates the disclosure of the claims, the specification and the drawings of Japanese Patent Application No. 2016-058396 (filed on Mar. 23, 2016) which is a Japanese Patent Application that serves as a basis of priority claim of the present application.

EXAMPLES

While the present invention will be described in more detail by the following examples, the present invention is not to be understood by being limited to the following examples.

Example 1

Effect of Low Endotoxin Sodium Alginate on Human Intervertebral Disc Cells 1-(1) Isolation and Culture of Non-Degenerated Human Intervertebral Disc Cells A nucleus pulposus tissue was collected from a non-degenerated human intervertebral disc tissue and treated in a DMEM (Dulbecco's modified Eagle's medium) containing 0.25% collagenase (Wako) at 37° C. for 4 hours to isolate nucleus pulposus cells. The resulting nucleus pulposus cells were cultured using DMEM containing 1% penicillin/streptomycin, 1.25 µg/ml fungizone (Invitrogen) and 10% FBS (fetal bovine serum) as a culture solution under the conditions of 37° C., 5% $CO_2$ and 20% $O_2$ to use second passage cells in the experiments.

1-(2) Preparation and Culture of Alginate Beads

Two types of sodium alginates, namely, (A) a sodium alginate that had received an endotoxin reduction treatment (Mochida Pharmaceutical) and (B) a food-grade (commercial-grade) sodium alginate (Wako Pure Chemical, 199-09961) shown in Table 1 below were used to culture and compare the human nucleus pulposus cells.

Milli-Q water was used to prepare respective sodium alginate solutions at a concentration of 2 w/v %. $4.0 \times 10^6$ cells of the human nucleus pulposus cells obtained in (1) above were suspended in 1.0 ml each of these sodium alginate solutions. The cell suspension was dropped into a 102 mM aqueous calcium chloride solution using a 22-gauge needle and left for 10 minutes, thereby preparing beads encapsulating the sodium alginate solution containing the nucleus pulposus cells.

The resulting beads were washed twice with 0.9% physiological saline and placed in a DMEM culture solution containing 1% penicillin/streptomycin, 1.25 µg/ml fungizone and 10% FBS to be three-dimensionally (3D) cultured under the conditions of 37° C., 5% $CO_2$ and 20% $O_2$. The cells were collected 48 hours, 7, 14 and 28 days after the start of the culture, and used for the following evaluations.

TABLE 1

| | Sodium alginate | Viscosity mPa · s (1% concentration) | Endotoxin concentration (EU/g) |
|---|---|---|---|
| A | Low-endotoxin sodium alginate | 300-600 *1 | Less than 50 |
| B | Food-grade sodium alginate | 500-600 *2 | 75950 |

*1 Measurement with a rotational viscometer
*2 According to the website of Wako Pure Chemical 1-(3) Evaluation of Percentage of Viable Cells The beads were collected 48 hours, 7, 14 and 28 days after the start of the culture, immersed and dissolved in a 55 mM aqueous sodium citrate solution at 4° C. for 20 minutes, and subjected to centrifugation to collect the cells. 5 µM Calcein AM and 1.5 µM propidium iodide (PI) were used to stain the obtained cells, which were observed with a confocal laser microscope (Olympus, FV300). ImageJ (National Institutes of Health, Bethesda, Md., USA) was used to calculate the percentage of viable cells by regarding Calcein AM-positive cells as viable cells and PI-positive cells as dead cells. At each time point of collecting cells, n was 5 (n=5).

The results obtained from the statistical analyses of the examples herein were indicated as mean value±standard deviation (mean±SD). Student's t-test was employed for comparison between two groups and Steel-Dwass-test was employed for comparison among multiple groups. Statistical significance was determined based on $p<0.05$.

As a result, percentages of viable cells in Group A (low endotoxin sodium alginate) and Group B (food-grade sodium alginate) were about 90% at every time points, i.e., 48 hours, 7, 14 and 28 days after the start of culture, and no difference was found in the percentages of viable cells between both groups.

1-(4) Evaluation of Apoptotic Cells

In the same manner as 1-(3), beads were collected 48 hours, 7, 14 and 28 days after the start of the culture, washed twice with PBS to collect washed cells, and $3.6 \times 10^5$ cells were labeled with Annexin V-fluorescein isothiocyanate (FITC) Apoptosis Detection Kit II (BD Biosciences, San Jose, Calif., USA) to count apoptotic cells with a flow cytometer (FACS Cant; BD biosciences, CA, USA). FITC+/PI− represented early apoptotic cells, FITC+/PI+ represented late apoptotic cells, and together they collectively represented apoptotic cells. The ratio of the viable cells to the total cells and the ratio of the apoptotic cells to the total cells were evaluated using FITC−/PI− as the viable cells. At each time point of collecting cells, n was 5 (n=5).

As a result, percentages of viable cells and ratios of apoptotic cells in Group A (low endotoxin sodium alginate) and Group B (food-grade sodium alginate) were about 90% and about 10%, respectively, at every time points, i.e., 48 hours, 7, 14 and 28 days after the start of culture, and no difference was found between both groups.

1-(5) Evaluation of Serum Starved Cells

Since the area inside a human intervertebral disc is avascular and in a low nutritional environment, cell culture tests assuming the environment inside an intervertebral disc were performed under serum starvation for evaluations.

Beads were collected on Day 7 of the 3D culture in 1-(2) and washed twice with PBS. The beads were added to a serum-free DMEM, 1% penicillin/streptomycin and 1.25 μg/ml fungizone medium, incubated under the conditions of 37° C., 5% $CO_2$ and 20% $O_2$ to induce serum starvation. The cells were collected 6 and 48 hours after the start of serum starvation. In the same manner as described above, evaluations using a confocal laser microscope and evaluations using a flow cytometer were performed.

As a result, in the evaluations using a confocal laser microscope under the serum starved conditions, no significant difference in the percentages of viable cells was seen between Group A (low endotoxin sodium alginate) and Group B (food-grade sodium alginate) at 6 and 48 hours, but the percentage of viable cells tended to be higher for Group A (low endotoxin sodium alginate) than Group B (food-grade sodium alginate) after 48 hours.

Figure 1:
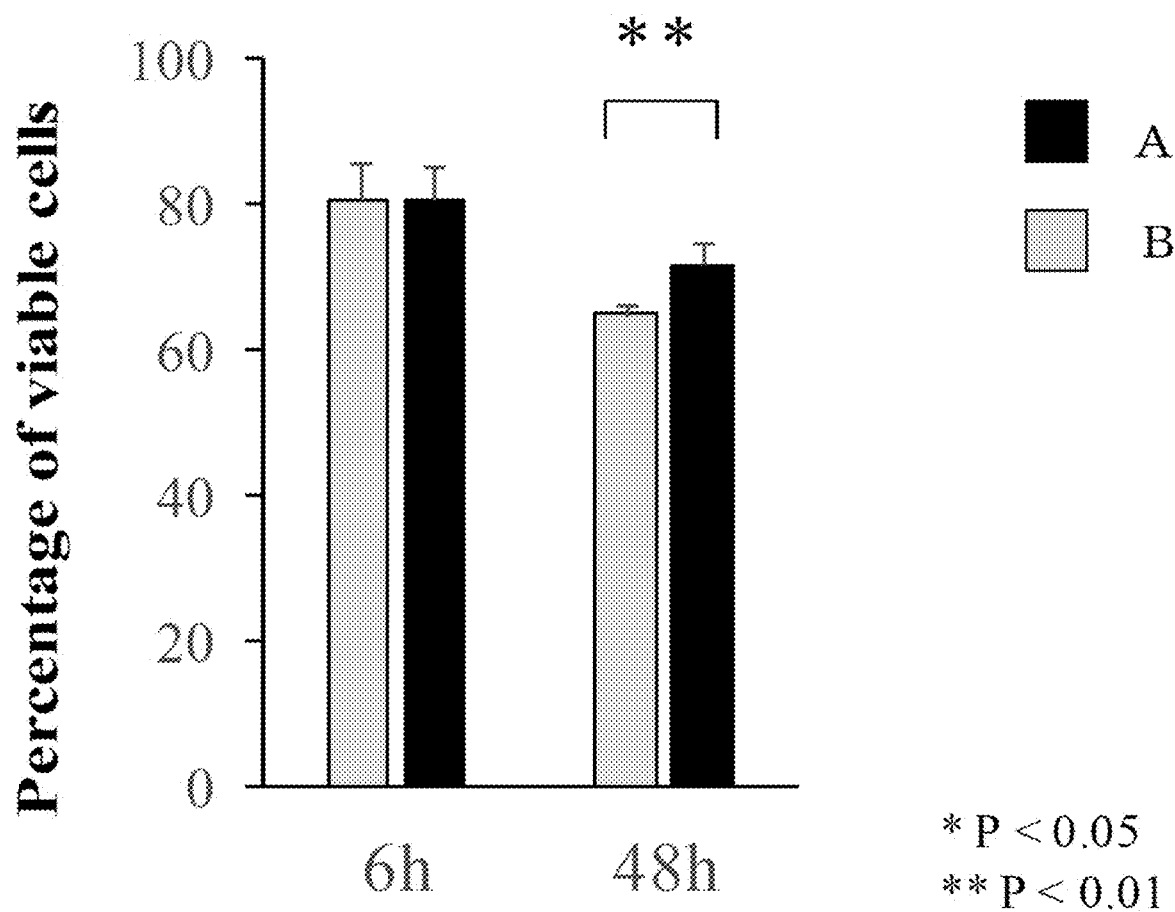
FIG. 1 shows percentages of viable cells at 6 and 48 hours after the start of serum starvation. Group A: low endotoxin sodium alginate; and Group B: food-grade sodium alginate.
Figure 2:
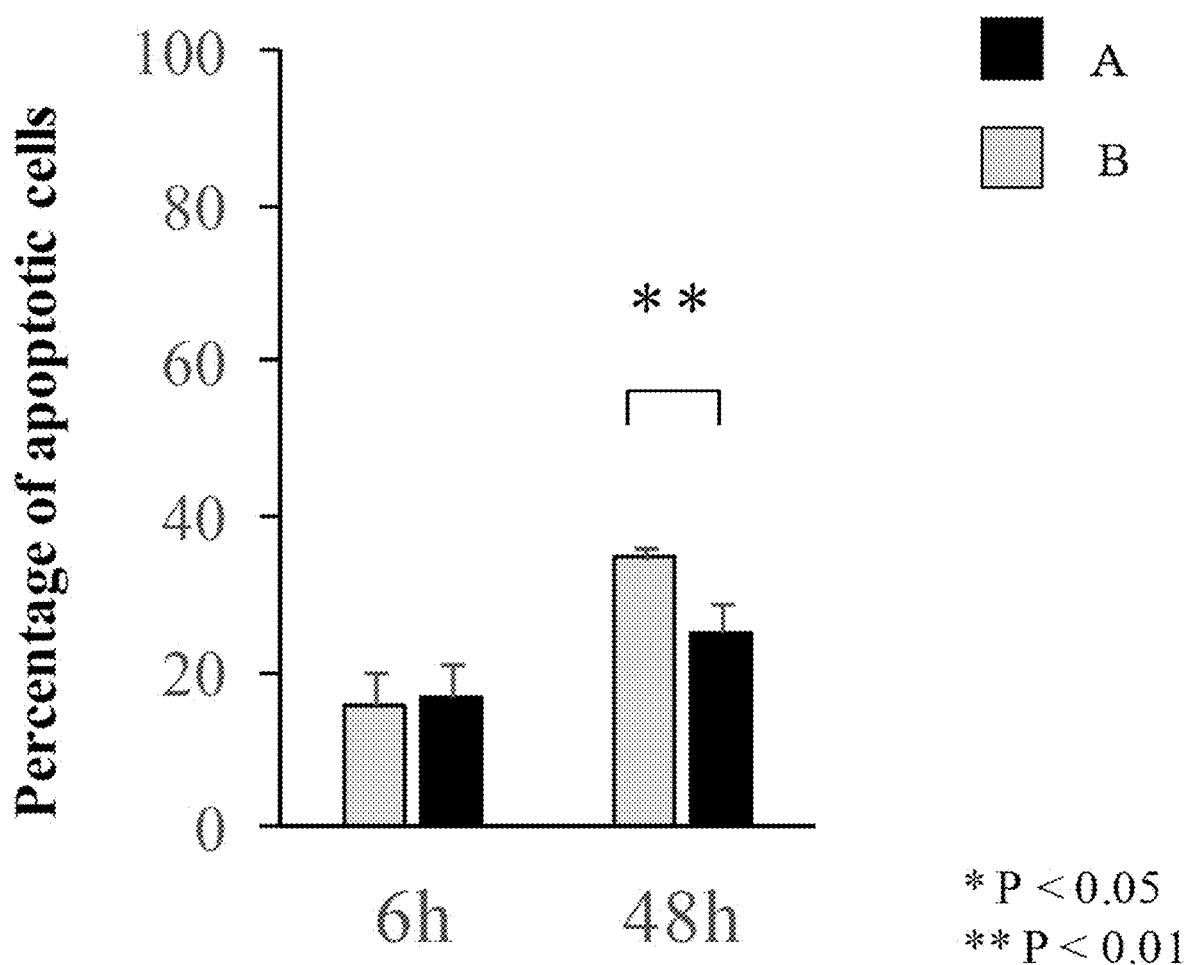
FIG. 2 shows percentages of apoptotic cells at 6 and 48 hours after the start of serum starvation. Group A: low endotoxin sodium alginate; and Group B: food-grade sodium alginate.

In the evaluations using a flow cytometer, no difference was observed between both groups in the samples after 6 hours, but the percentage of viable cells was significantly higher and the percentage of apoptotic cells was significantly lower in Group A (low endotoxin sodium alginate) than Group B (food-grade sodium alginate) after 48 hours (FIGS. 1 and 2).

Induction of serum starvation in this test assumes the environment of a human nucleus pulposus of a intervertebral disc, that is, an avascular area in a low nutritional environment. Culture of the nucleus pulposus cells using a low endotoxin sodium alginate was suggested to be highly resistant to apoptosis induced by serum starvation as compared to the case where a food-grade sodium alginate was used. Specifically, compared to the food-grade sodium alginate, the low endotoxin sodium alginate was suggested to retain a ratio of cell viability without inducing apoptosis of the nucleus pulposus cells when filled into a nucleus pulposus site of an intervertebral disc.

Example 2

Application of Low Endotoxin Sodium Alginate Solution to Rabbit Intervertebral Disc Nucleus Pulposus Defect Model Two types of low endotoxin sodium alginate solutions were used to fill rabbit intervertebral disc nucleus pulposus defect models to evaluate their effects.

2-(1) Preparation of Rabbit Intervertebral Disc Nucleus Pulposus Defect Model

Japanese White rabbits weighing 3.2-3.5 kg received intravenous anesthesia with pentobarbital and local anesthesia with 1% xylocaine, and the nucleus pulposus tissue of the intervertebral disc was suctioned with a 18G needle to prepare an intervertebral disc nucleus pulposus defect model. Suction was conducted for the nuclei pulposi of the L2/3 and L4/5 intervertebral discs to use them as intervertebral disc defect models and suction was not conducted for L3/4 to use it as a normal intervertebral disc (normal control group).

2-(2) Filling with Low Endotoxin Sodium Alginate Solution

The following two types of low endotoxin sodium alginates were used. Both of them had endotoxin contents of less than 50 EU/g. The apparent viscosity and the weight-average molecular weight of each of the low endotoxin sodium alginates are as shown in Table 2. The apparent viscosity measurement of a sodium alginate was conducted by employing a rotational viscometer method (cone-plate rotational viscometer) according to the viscosity measurement method of the Japanese Pharmacopoeia (16th edition). Specific measurement conditions were as follows. Sample solutions were prepared using MilliQ water. As the measurement instrument, a cone-plate rotational viscometer (viscosity/viscoelasticity measurement device RheoStress RS600 (Thermo Haake GmbH) sensor: 35/1) was used. The rotation speeds were 1 rpm for measuring a 1 w/w % sodium alginate solution, and 0.5 rpm for measuring a 2 w/w % sodium alginate solution. The reading times were 2 minutes of measurement for the 1 w/w % solution to obtain an average value between 1 to 2 minutes after the start of the measurement, and 2.5 minutes of measurement for the 2 w/w % solution to obtain an average value between 0.5 to 2.5 minutes after the start of the measurement. An average value of three times of measurements was used as the measured value. The temperature for the measurements was 20° C.

The weight-average molecular weight of each of the sodium alginates was measured by two types of measurements, namely, gel permeation chromatography (GPC) and GPC-MALS. The measurement conditions were as follows.

[Pretreatment Process]

The sample was added with an eluent to be dissolved and filtrated through a 0.45 μm membrane filter to obtain a measurement solution (1) Gel Permeation Chromatography (GPC) Measurement

[Measurement Conditions (Relative Molecular Weight Distribution Measurement)]

Columns: TSKgel GMPW-XL×2+G2500PW-XL (7.8 mm I.D.×300 mm×3 columns)

Eluent: 200 mM aqueous sodium nitrate solution

Flow rate: 1.0 mL/min

Concentration: 0.05%

Detector: RI detector

Column temperature: 40° C.

Injected amount: 200 μL

Molecular weight standard: Pullulan standard, glucose (2) GPC-MALS Measurement

[Refractive Index Increment (dn/dc) Measurement (Measurement Conditions)]

Differential refractometer: Optilab T-rEX

Measurement wavelength: 658 nm

Measurement temperature: 40° C.

Solvent: 200 mM aqueous sodium nitrate solution

Sample concentrations: 0.5-2.5 mg/mL (5 concentrations)

[Measurement Conditions (Absolute Molecular Weight Distribution Measurement)]

Columns: TSKgel GMPW-XL×2+G2500PW-XL (7.8 mm I.D.×300 mm×3 columns)

Eluent: 200 mM aqueous sodium nitrate solution

Flow rate: 1.0 mL/min

Concentration: 0.05%

Detector: RI detector, light scattering detector (MALS)

Column temperature: 40° C.

Injected amount: 200 μL

TABLE 2

|  | Apparent viscosity (mPa · s) | | weight-average molecular weight | | M/G ratio |
|---|---|---|---|---|---|
|  | 1 w/w % | 2 w/w % | GPC | GPC-MALS |  |
| A-1 | 50-150 | 500-1200 | 700,000-1,000,000 | 100,000-200,000 | 0.6-1.8 |
| A-2 | 300-600 | 3000-6000 | 1,100,000-1,700,000 | 200,000-400,000 |  |

Each of the low endotoxin sodium alginates was dissolved in Milli-Q water to prepare a 2 w/v % solution.

A needle was inserted from the side of the intervertebral disc toward the nucleus pulposus to inject 20 μl of the low endotoxin sodium alginate solution into the nucleus pulposus defective part. A 102 mM aqueous calcium chloride solution was applied for several seconds to the side of the intervertebral disc where the needle had been pulled out (these were named Groups A-1 and A-2, respectively, and collectively referred to as treatment groups).

The group that only received nucleus pulposus suction was named a suction only group.

Animals were euthanatized by excessive filling of pentobarbital four weeks after the surgery to take out the lumbar vertebra and collect the intervertebral disc tissues. Group A-2 was also evaluated twelve weeks after the surgery. This was conducted for 8 examples per group.

2-(3) Evaluation of Intervertebral Disc Tissues by MRI, Pfirrmann Classification An T2-weighted sagittal image of the intervertebral disc was taken with 7.0-Tesla MR scanner (Unity Inova, Varian). Changes due to degeneration of the intervertebral disc can be confirmed with the T2-weighted MRI image of the intervertebral disc. Severity of the intervertebral disc degeneration was scored using Pfirrmann classification for evaluation. This classification is a grading system for evaluating intervertebral disc degeneration on MRI by five grades (grade 1: normal to grade 5: highly degenerated). Criteria for evaluating the intervertebral disc degeneration are shown in Table 3 (Spine (Phila Pa 1976). 2001; 26(17) 1873-8).

TABLE 3

| Grade | Structure | Distinction nucleus pulposus and annulus fibrosus | Signal intensity | Height of intererebral disc |
|---|---|---|---|---|
| 1 | Homogenous, bright white | Clear | Hyperintense, isointense to cerebrospinal fluid | Normal |
| 2 | Inhomogeneous with or without horizontal bands | Clear | Hyperintense, isointense to cerebrospinal fluid | Normal |
| 3 | Inhomogeneous, gray | Unclear | Intermediate | Normal to slightly decreased |
| 4 | Inhomogeneous, gray to black | Lost | Intermediate to hypointense | Normal to moderately decreased |
| 5 | Inhomogeneous, black | Lost | Hypointense | Collapsed intervertebral disc space |

Figure 3:
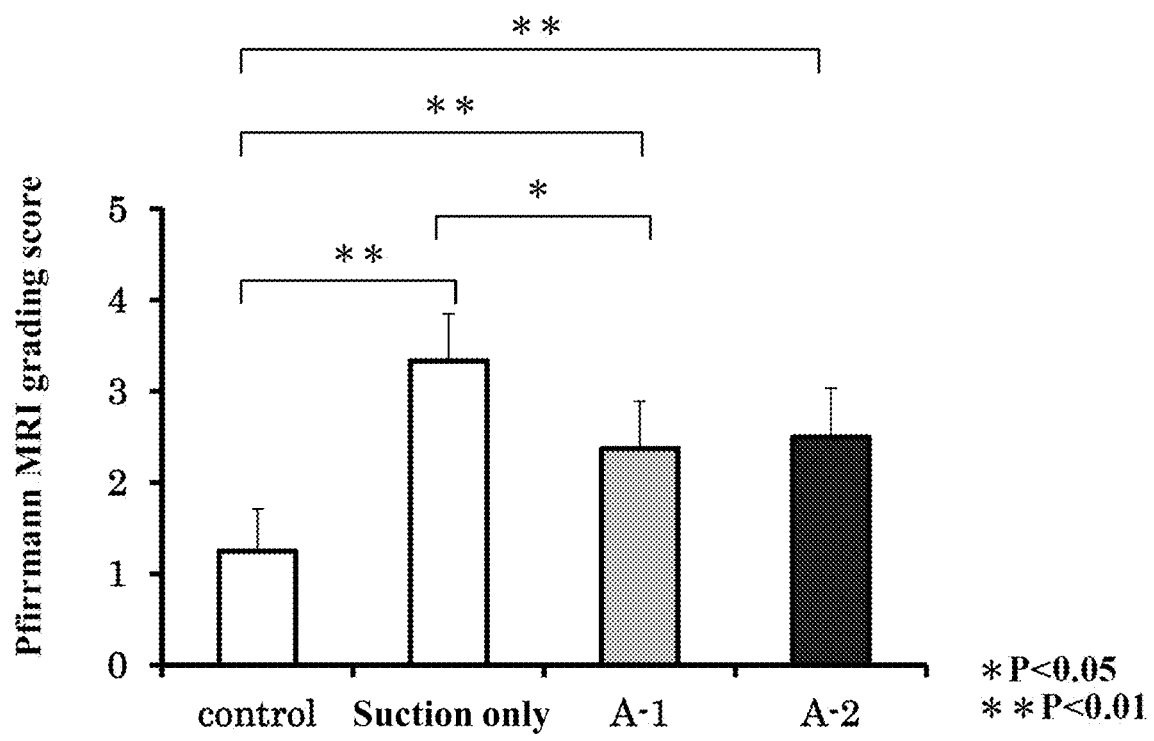
FIG. 3 is a graph showing evaluation results of the intervertebral disc tissues according to Pfirrmann classification at four weeks after the surgery. A normal control group, a suction only group and treatment groups (Groups A-1 and A-2).

As a result, according to Pfirrmann classification for scoring severity of intervertebral disc degeneration, the suction only group and the treatment groups (Groups A-1 and A-2) had significantly higher scores than the normal control group four weeks after the surgery, indicating intervertebral disc degeneration. Moreover, Group A-1 had significantly lower score than the suction only group, indicating suppression of degeneration. While there was no significant difference in the scores between Group A-2 and the suction only group, Group A-2 showed a tendency to have lower scores than the suction only group (FIG. 3).

According to evaluations of Group A-2 twelve weeks after the surgery, the scores of Group A-2 were significantly lower than those of the suction only group.

2-(4) Evaluation of Intervertebral Disc Tissue by MRI Index

Analyze 10.0 software (AnalyzeDirect, Overland Park, Kans., USA) was used to measure the sagittal MRI index (the product of average signal intensity and area of the nucleus pulposus) for quantitative evaluation. Evaluation was performed based on the ratio of the MRI index for each group with respect to the MRI index of the intervertebral disc of the normal control group as 100 (see Spine (Phila Pa 1976). 2005 Jan. 1; 30(1):15-24).

Figure 4:
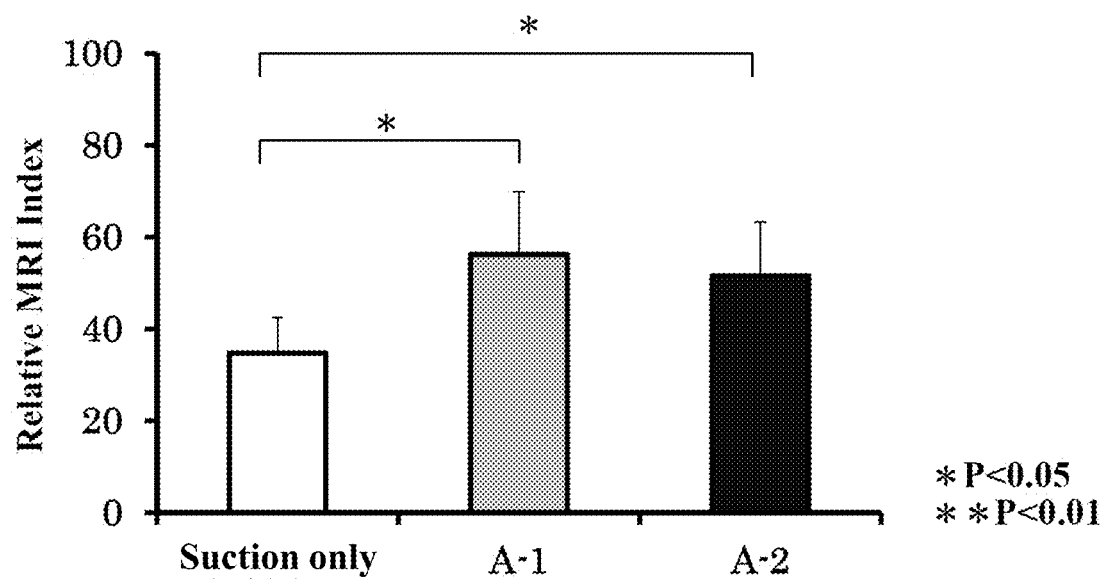
FIG. 4 is a graph showing evaluation results of the intervertebral disc tissues according to MRI index at four weeks after the surgery. A suction only group and treatment groups (Groups A-1 and A-2).

As a result, the MRI indices of the treatment groups (Groups A-1 and A-2) was significantly higher than that of the suction only group four weeks after the surgery, indicating suppression of degenerative change (FIG. 4).

The evaluation for Group A-2 twelve weeks after the surgery also showed that the MRI index of Group A-2 was significantly higher than that of the suction only group.

2-(5) Histological Evaluation

After the MRI imaging, tissue specimens of the intervertebral discs were prepared. A sample was fixed with 10% formaldehyde, decalcified with 10% EDTA (pH7.5) and embedded in paraffin. A 5 μm-thick sagittal paraffin section was deparaffinized with xylene, treated with alcohol, washed with water, and then subjected to HE staining and safranin-O staining. Classification for degenerative change in the annulus fibrosus by Nishimura et al. (Spine (Phila Pa 1976). 1998; 23(14):1531-8) was used to score the degree of degeneration in the whole tissue of the intervertebral disc. Classification by Nishimura et al. is as follows.

Figure 5:
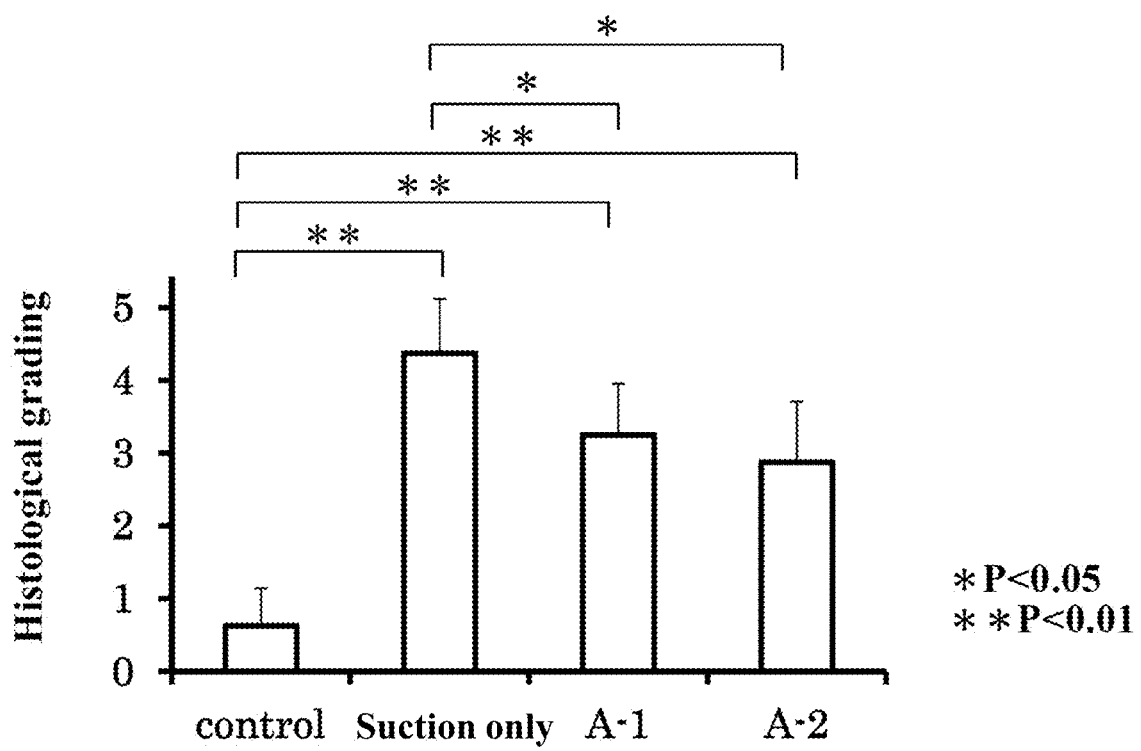
FIG. 5 is a graph showing histological evaluation results of severity of the intervertebral disc degeneration at four weeks after the surgery. A normal control group, a suction only group and treatment groups (Groups A-1 and A-2).

Grade 1: Mildly serpentine with rupture
Grade 2: Moderately serpentine with rupture
Grade 3: Severely serpentine with mildly reversed contour
Grade 4: Severely reversed contour
Grade 5: Indistinct As a result of histological evaluation of the severity of the intervertebral disc degeneration, the suction only group and the treatment groups (Groups A-1 and A-2) showed significantly higher scores than those of the normal control group four weeks after the surgery according to the classification by Nishimura et al., indicating degeneration. The treatment groups (Groups A-1 and A-2), however, showed significantly lower scores than that of the suction only group, indicating suppression of degeneration (FIG. 5).

Figure 6:
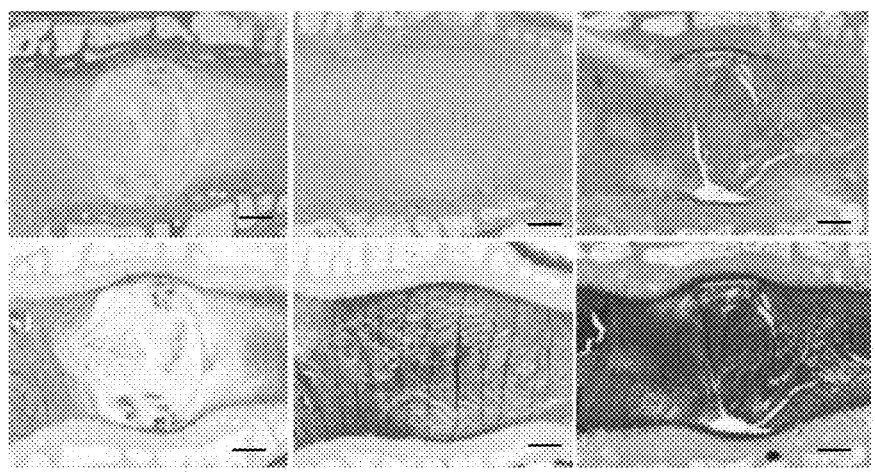
Figure 6:
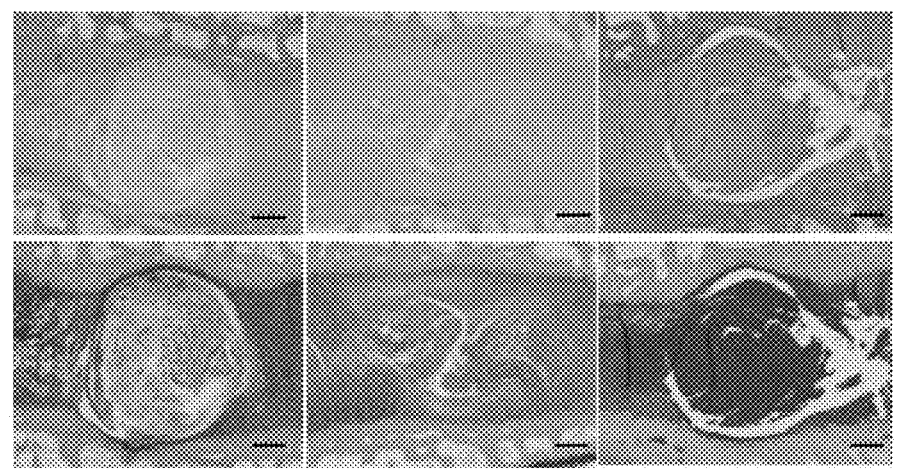

The evaluation for Group A-2 twelve weeks after the surgery also showed that Group A-2 scored significantly lower than the suction only group. Pictures of the tissue specimens from the normal control group, the suction only group and Group A-2 four and twelve weeks after the surgery are shown (FIG. 6).

2-(6) Immunohistological Evaluation

The tissue specimens prepared in 2-(5) were subjected to immunohistological staining using anti-Type I collagen antibody and anti-Type II collagen antibody to count the positive cell numbers in five randomly selected view fields of the nucleus pulposus of the intervertebral disc.

As a result, there was no difference in the ratio of the anti-Type I collagen antibody-positive cells to the cell numbers in the sections four weeks after the surgery among the normal control group, the suction only group and the treatment groups (Groups A-1 and A-2).

On the other hand, the ratios of the anti-Type II collagen antibody-positive cells of both of the suction only group and the treatment groups (Groups A-1 and A-2) four weeks after the surgery were significantly lower than that of the normal control group, indicating that production of extracellular matrix seen in a normal intervertebral disc tissue was decreased. The ratios of the anti-Type II collagen antibody-positive cells of the treatment groups (Groups A-1 and A-2), however, were significantly higher than that of the suction only group.

According to evaluation for Group A-2 twelve weeks after the surgery, the ratios of the anti-Type II collagen antibody-positive cells of Group A-2 were significantly higher than those of the suction only group and was shown to be no difference from those of the normal control group. Graphs of the ratios of the anti-Type II collagen antibody-positive cells to the cell numbers in the nucleus pulposus tissue sections of the intervertebral discs four and twelve weeks after the surgery are shown in FIG. 7 for the normal control group, the suction only group and Group A-2. The Type II collagen antibody-positive cells represent the presence of hyaline cartilage-like cells. The ratio of the hyaline cartilage-like cells in the rabbit nucleus pulposus of the intervertebral disc was shown to recover to a level comparative to that of the normal control group by twelve weeks after the surgery by using the low endotoxin sodium alginate solution.

Accordingly, the low endotoxin sodium alginate solution was found to suppress degenerative changes and promote regeneration of the whole tissue of the intervertebral disc and nucleus pulposus by being filled into the nucleus pulposus defective part. Furthermore, the low endotoxin sodium alginates A-1 and A-2 showed effects of suppressing degeneration and regenerating the intervertebral disc to similar degrees.

In terms of handing property, the 2% solution of A-2 that had higher viscosity than that of the 2% solution of A-1 was advantageous in that it was more unlikely to flow back from the filled site when being filled into the nucleus pulposus site and in that it can easily be distinguished from the body fluid. The 2% solution of A-2 had suitable viscosity for filling and thus was found have an excellent handing property.

Example 3

Examination of Method for Injecting Low Endotoxin Sodium Alginate Solution 3-(1) Examination of Method for Injecting Low Endotoxin Sodium Alginate Solution The following two types of injection processes (i) and (ii) were employed to inject a low endotoxin sodium alginate solution into a lumbar vertebra of a sheep cadaver for evaluations.

(i) A process in which the 2% low endotoxin sodium alginate solution of A-2 described in Example 2 is injected into a partially resected nucleus pulposus site of an intervertebral disc, and then a 100 mM calcium chloride solution is brought into contact near the needle hole on the surface of the intervertebral disc (a part of the sodium alginate that makes contact with the calcium chloride solution iscured), according to the description of Example 2.

(ii) A process in which the 2% low endotoxin sodium alginate solution of A-2 and a 100 mM calcium chloride solution are simultaneously used 1:1 to fill the partially resected nucleus pulposus site of the intervertebral disc (the entire sodium alginate injected into the nucleus pulposus site is cured).

Process (ii) was conducted by placing the low endotoxin sodium alginate solution and the calcium chloride solution in separate syringes and then simultaneously injecting them into the defective site of the nucleus pulposus of the intervertebral disc with a 22G needle.

As a result, there was no difficulty in the manipulation of injection when process (i) was performed for the intervertebral disc of the sheep cadaver. Meanwhile, process (ii) seemed to have low reproducibility with respect to keeping a constant mixed ratio of the low endotoxin sodium alginate solution and the calcium chloride solution. Moreover, when partial gelation occurs during filling, it is questionable if the gel can fill the remaining cavity without leaving a space. Furthermore, when compression force was applied to the intervertebral disc from the head and tail sides after the curing gel filled the nucleus pulposus site of the intervertebral disc by process (ii), a phenomenon in which the cured gel deviated from the hole for injecting the gel on the side of the intervertebral disc was observed. No deviation from the intervertebral disc was observed with process (i).

Process (i) can reduce the calcium concentration in the intervertebral disc as compared to process (ii), and has a merit of alleviating cytotoxicity. In addition, while process (ii) has a risk where the cured gel may protrude into the spinal canal to cause serious neuropathy, process (i) has a lower risk.

Accordingly, process (i), that is, a process in which a low endotoxin sodium alginate solution is injected into the nucleus pulposus site of the intervertebral disc and thereafter a calcium chloride solution is applied to the surface of the intervertebral disc, seemed to be a suitable process for filling the nucleus pulposus with a low endotoxin sodium alginate.

3-(2) Mechanical Test with Sheep Cadaver

To the intervertebral disc of a sheep cadaver prepared by process (i) in 3-(1) (which was obtained by injecting the 2% low endotoxin sodium alginate solution of A-2 into the partially resected nucleus pulposus site of the intervertebral disc and then bringing the 100 mM calcium chloride solution into contact around the needle hole on the surface of the intervertebral disc), Instron 5943 (Instron) was used, an hour after the filling, to apply compression force and stretching force to the intervertebral disc from the head and tail sides repeatedly for 1000 times at a axial compression/stretching force of −300N-300N to observe if there was any deviation from the hole used for injecting the sodium alginate solution. For improving visibility, the sodium alginate solution colored with 0.05% Toluidine blue was used.

As a result, deviation of the sodium alginate solution from the intervertebral disc via the injection opening was not observed. Thus, the process of injecting a sodium alginate solution into the nucleus pulposus of the intervertebral disc and thereafter curing around the injection opening on the surface of the intervertebral disc with a crosslinking agent was suggested to be a filling process that can withstand the compression force and the stretching force on the intervertebral disc caused by change in the posture, walking or the like, after filling with the sodium alginate solution.

Example 4

Examination of Properties After Injection of Low Endotoxin Sodium Alginate Solution The following examinations were conducted in vitro in order to predict the properties of the injected low endotoxin sodium alginate solution in the nucleus pulposus of the intervertebral disc when a low endotoxin sodium alginate solution was injected into the nucleus pulposus of the intervertebral disc and thereafter a calcium chloride solution was brought into contact with around the injection opening of the sodium alginate solution injection on the surface of the intervertebral disc to cure the contact site.

4-(1) Test Method

Sodium alginate solutions were placed into respective micro test tubes (diameter 6 mm, height 25 mm) by the following three methods X, Y and Z, and the test tubes were laid down to stand still. 1, 24, 48 hours and 1 week later, the properties of the test substances in the test tubes were evaluated. Since the annulus fibrosus was incised for 5 mm×3 mm to resect the nucleus pulposus for the sheep intervertebral nucleotomy model of Example 5, a micro test tube with a diameter of 6 mm was selected as a size that was relatively close to the size of this in vivo test and that allowed operations inside the test tube. The low endotoxin sodium alginate of A-2 in Example 2 was dissolved with physiological saline to be used as a 2 w/v % solution. The test was conducted at room temperature, i.e., 20° C.

TABLE 4

| | Methods |
|---|---|
| X | 500 µL of a 2 w/v % sodium alginate solution was placed in a test tube, 50 µL of a 100 mM calcium chloride solution was dropped onto the surface of the sodium alginate solution, and the resultant was left to stand for 5 minutes. Thereafter, the calcium chloride solution on the surface was washed three times with physiological saline. |
| Y | 200 µL each of a 2 w/v % sodium alginate solution and a 25 mM calcium chloride solution were placed and agitated in a test tube. |
| Z | 200 µL each of a 2 w/v % sodium alginate solution and a 100 mM calcium chloride solution were placed and agitated in a test tube. |

4-(2) Results

The 2 w/v % sodium alginate solution used for the test had higher viscosity than physiological saline, and thus the liquid surface moved slowly when the vial was inclined and the solution could be suctioned with a syringe with a 21G needle by taking time.

The properties of group X were generally the same from 1 hour later to 1 week later. Specifically, while about 2-3 mm of the surface of the sodium alginate solution in the test tube was gel-like, no solidification was observed and the solution was in a sol state in the area other than the surface. While most of the sol state part could be suctioned using a syringe with a 21G needle, it took longer time to be suctioned than the 2 w/v % sodium alginate solution due to higher viscosity.

The properties of group Y were generally the same from 1 hour later to 1 week later. Specifically, most of the solution in the test tube gelled like jelly with a small liquid part similar to water. This was assumed to be a "syneresis" phenomenon in which gel shrinks to separate and exude liquid. The gelled part could not be suctioned using a syringe with a 21G needle.

The properties of group Z were generally the same from 1 hour later to 1 week later. Specifically, a white cloudy gelled mass with a diameter of about 5 mm was formed with the remaining part being liquid similar to water. This was also assumed to be a "syneresis" phenomenon. The gelled part could not be suctioned using a syringe with a 21G needle.

The method of group X resembled the method of injection into an nucleus pulposus of an intervertebral disc in the examples of the present invention, and a sodium alginate solution was assumed to exist in a sol state when it was injected into an nucleus pulposus of the intervertebral disc. Meanwhile, they were in gel state in both groups Y and Z, and thus there was a concern that the cured gel might deviate from the side of the intervertebral disc injected with the gel when compression force was applied from the head and tail sides, after filling the nucleus pulposus of the intervertebral disc with the gel, as confirmed in Example 3 of the present invention.

Example 5

Application of Low Endotoxin Sodium Alginate Solution to Sheep Intervertebral Disc Nucleus Pulposus Defect Model A sheep intervertebral disc nucleus pulposus defect model was filled with a low endotoxin sodium alginate solution to evaluate the effect. Intervertebral discs L1/2, L2/3, L3/4, and L4/5 from seven sheep (male, Suffolk) weighing 40 kg-60 kg were used to perform the following evaluations.

5-(1) Preparation of Sheep Intervertebral Disc Nucleus Pulposus Defect Models

Sheep were anesthetized, and intervertebral discs were exposed with an electric scalpel. The annulus fibrosus of each intervertebral disc was incised and removed for 5 mm×3 mm. Forceps was inserted into that hole to remove 0.10 g of a nucleus pulposus for preparing an intervertebral disc nucleus pulposus defect model. Here, the incision size of the annulus fibrosus, and the amount of the nucleus pulposus removed were determined by performing an intervertebral disc degeneration test by a sheep intervertebral nucleotomy in advance. The incised size of the annulus fibrosus was investigated for 5 mm×3 mm and 10 mm×3 mm, and 5 mm×3 mm was selected which showed progress of the intervertebral disc degeneration depending on the volumes of the removed nucleus pulposus. Four nucleus pulposus resected volumes, namely, 0.02 g, 0.05 g, 0.1 g and 0.2 g, were examined. An resected volume of 0.1 g for a sheep nucleus pulposus corresponds to 1.2 g in a human, which is closest to the nucleus pulposus resected volume in human clinical practice. Thus, a nucleus pulposus resected volume of 0.1 g was selected.

5-(2) Filling Low Endotoxin Sodium Alginate Solution

The low endotoxin sodium alginate of A-2 in Example 2 was prepared into a 2 w/v % solution with Milli-Q water, and 0.10 ml of the resultant was injected into the nucleus pulposus defective part of the sheep intervertebral disc prepared in 5-(1) with a syringe. A 102 mM aqueous calcium chloride solution was applied to the surface of the injected sodium alginate solution for several seconds. After leaving it for about 5 minutes, the part applied with the calcium chloride solution was washed with physiological saline and sutured. They were grouped as a treatment group (n=11). Moreover, those that only received the intervertebral nucleotomy in 5-(1) and sutured were grouped as a nucleotomy group (n=10). Untreated sheep intervertebral discs were grouped as a normal control group (n=7).

Animals were euthanatized by excessive administration of pentobarbital four weeks after the surgery to take out the lumbar vertebrae and collect the intervertebral disc tissues.

5-(3) Histological Evaluation

HE staining and safranin O staining were conducted according to the description in 2-(5) above to prepare tissue specimens of the intervertebral discs. Modified classification based on Boos classification (Eur Spine J. 2014 Jan; 23(1): 19-26. Spine 2002 Vol. 27, No. 23 p. 2631-2644) was employed to evaluate the degrees of intervertebral disc degeneration. Classification is shown in Table 5. The maximum point of the items for an intervertebral disc was 20 while the maximum point of the items for a vertebral body endplate was 16, and evaluation was conducted with the total point of 36 at the maximum.

TABLE 5

| Intervertebral disc (Maximum of 20 points) | Vertebral body endplate (Maximum of 16 points) |
|---|---|
| Cells (chondrocyte proliferation) | Acinous cell number |
| 0 = No proliferation | 0 = Absent |
| 1 = Increased cell density | 1 = Rarely present |
| 2 = Connection of two chondrocytes | 2 = Present in intermediateamounts |
| 3 = Small size clones (3-7 cells) | 3 = Abundantly present |
| 4 = Moderate size clones (8-15 cells) | |
| 5 = Huge clones (16 cells or more) | |
| Changes in indefinite acidophilic granules | Disorganization of cartilage structure |
| 0 = Absent | 0 = Absent |
| 1 = Rarely present | 1 = Rarely present |
| 2 = Present in intermediate amounts | 2 = Present in intermediate amounts |
| 3 = Abundantly present | 3 = Abundantly present |
| Neovascularization | cartilage cracks |
| 0 = Absent | 0 = Absent |
| 1 = Present | 1 = Rarely present |
| | 2 = Present in intermediate amounts |
| | 3 = Abundantly present |
| Annulus fibrosus cracks(micro cracks at edges) | Microfracture |
| 0 = Absent | 0 = Absent |
| 1 = Rarely present | 1 = Rarely present |
| 2 = Present in intermediate amounts | 2 = Present in intermediate amounts |
| 3 = Abundantly present | 3 = Abundantly present |
| Annulus fibrosus cracks (concentriccracks) | Neovascularization |
| 0 = Absent | 0 = Absent |
| 1 = Rarely present | 1 = Present |
| 2 = Present in intermediate amounts | |
| 3 = Abundantly present | |
| Tears of annulus fibrosus | New bone formation |
| 0 = Absent | 0 = Absent |
| 1 = Rarely present | 1 = Present |
| 2 = Present in intermediate amounts | |
| 3 = Abundantly present | |
| Scar formation | Scar formation |
| 0 = Absent | 0 = Absent |
| 1 = Present | 1 = Present |
| Tissue defects | Tissue defects |
| 0 = Absent | 0 = Absent |
| 1 = Present | 1 = Present |

Results from histological evaluation of severity of the intervertebral disc degeneration showed that the scores of the nucleotomy group and the treatment group four weeks after the surgery were significantly higher than that of the normal control group according to the classification shown in Table 5, suggesting degeneration. The score of the treatment group, however, was significantly lower than that of the nucleotomy group, showing suppression of degeneration (FIG. 8).

Furthermore, the heights of the intervertebral discs were evaluated by disc height index (DHI). A disc height index is a value derived by dividing the intervertebral disc height (an average of the anterior, mid-disc and posterior heights of the intervertebral disc) by the anterior-posterior diameter of the intervertebral disc (Eur Spine J. 2014, 23(1):19-26).

As a result, the disc height index of the nucleotomy group was significantly decreased as compared to that of the normal control group. Meanwhile, there was no significant difference in the disc height index between the treatment group and the normal control group. Accordingly, filling the nucleus pulposus with a low endotoxin sodium alginate solution was found to suppress decrease in the intervertebral disc height caused by nucleus pulposus resection (FIG. 9).

5-(4) Immunohistological Evaluation

The tissue specimens prepared in 5-(3) above were subjected to immunohistological staining using anti-Type I collagen antibody and anti-Type II collagen antibody to count the positive cell numbers in five randomly selected view fields of the nucleus pulposus of the intervertebral disc.

As a result, the ratios of the anti-Type I collagen antibody-positive cells to the cell numbers in the sections four weeks after the surgery were significantly higher for the nucleotomy group and the treatment group while it was 10% or lower for the normal control group. However, the ratio of the anti-Type I collagen antibody-positive cells was significantly lower for the treatment group than the nucleotomy group.

The ratios of the anti-Type II collagen antibody-positive cells to the cell numbers in the sections four weeks after the surgery were about 60% for the normal control group and the treatment group, showing no difference. Meanwhile, the nucleotomy group gave about 40%, which was significantly different from the normal control group and the treatment group (FIG. 10). While the ratio of the anti-Type II collagen antibody-positive cells obtained with nucleus pulposus excision alone was lower than that obtained for the normal group, it was found to recover to a level comparative to the normal control group four weeks after the surgery by filling a low endotoxin sodium alginate solution.

From the above-described results, application of the low endotoxin sodium alginate solution to the nucleus pulposus was shown to suppress degeneration and promote regeneration of the nucleus pulposus of the intervertebral disc. Together with the results from the dynamic test of Example 3, the composition of the present invention was found favorable to be used particularly for filling a nucleus pulposus after an intervertebral nucleotomy. Moreover, the decrease in the disc height index due to the nucleus pulposus resection was suppressed in the treatment group, suggesting the possibility of preventing and/or alleviating degeneration of an intervertebral disc adjacent to the treated intervertebral disc as well.

Example 6

Examination of Composition Making Up Nucleus Pulposus of Sheep Intervertebral Disc An extracellular matrix of a nucleus pulposus of an intervertebral disc is mainly composed of water, Type-II collagen and proteoglycan, and is said to have a higher proteoglycan ratio to collagen as compared to other cartilage tissues such as intervertebral disc endplates and an articular cartilage. There is a document describing this proteoglycan ratio to collagen as a ratio of sulfated glycosaminoglycan (GAG) to hydroxyproline (HYP) (European Cells and Materials Vol. 8. 2004 p. 58-64).

A sheep intervertebral disc nucleus pulposus defect model was filled with a low endotoxin sodium alginate solution, and evaluated through a biochemical analysis of the nucleus pulposus tissue four weeks after the surgery according to the above-mentioned document.

6-(1) Method

Intervertebral discs L1/2, L2/3, L3/4 and L4/5 from two sheep (male, Suffolk) weighing 35 kg-60 kg were used for the test. Sheep intervertebral disc nucleus pulposus defect models were prepared according to Example 5, into which a 2 w/v % low endotoxin sodium alginate solution was filled to obtain a treatment group (n=4). A group that received only intervertebral nucleotomy and sutured according to Example 5 was obtained as a nucleotomy group (n=4). Untreated sheep intervertebral discs (T12/L1, L5/6) were obtained as a normal control group (n=4). The nucleus pulposus of the intervertebral disc and the cartilage tissue (articular cartilage) of the untreated left and right femurs were collected four weeks after the surgery to measure sulfated glycosaminoglycan (GAG) and hydroxyproline (HYP) following pre-treatment of the specimens.

The specimens were pretreated by lyophilizing the specimens, measuring the dry weights, and adding a 20 mM HEPES buffer (pH7.5) containing 1 mL Pronase solution (Calbiochem) at a concentration of 1 mg/mL to the dried specimens to digest at 60° C. for 3 hours while agitating every 1 hour. The resultants were centrifuged at 8,000×g for 10 minutes, and the resulting supernatants were used as sample stock liquids for the measurements. The stock liquids were refrigerated until the measurements.

Sulfated glycosaminoglycan (GAG) was measured by using Wieslab (registered trademark) sGAG quantitative kit (Euro Diagnostica, product number: GAG201RUO) according to the instructions to measure the GAG amount. The sample stock liquids for measurements were 100-fold diluted with purified water so as to use the resulting dilution solutions as samples for the measurement. A blank sample was a 100-fold diluted Pronase solution. The measurement wavelength was 620 nm, and a calibration curve prepared based on chondroitin 6-sulfate (CS-6) as a standard in the measurement kit was used to calculate the GAG amount in the specimen.

Hydroxyproline (HYP) was measured as follows. The sample stock liquids for measurements were 100-fold diluted with purified water so as to use the resulting dilution solution as samples for the measurement. A blank sample was a 100-fold diluted Pronase solution. 50 µL of the measurement sample was collected into a vial bottle for hydrolysis, to which an equivalent amount of concentrated hydrochloric acid was added and sealed to allow hydrolysis at 120° C. for 16 hours. Three hydrolysis samples per specimen were prepared. 20 µL of the hydrolysis sample and 100 µL of a HYP standard solution were collected into a well plate, and depressurized at 40° C. for 15 hours to dry and solidify. 100 µL of purified water was added to the dried sample and allowed to develop a color to measure the absorbance at 557 nm according to the method of Woessner (Woessner J F Jr, Arch Biochem Biophys, 93,(1961) p. 440-44'7). Since the dilution rates of the measurement samples upon hydrolysis and color development were 10 times, total dilution rate was 1000 times. A calibration curve prepared based on the results of the standard HYP solution was used to calculate the HYP amounts in the specimens.

6-(2) Results

The GAG amount and HYP amount (µg/mg dry weight) of the specimens in dry weight were obtained to derive the ratio of GAG to HYP (GAG/HYP). An average value and a standard deviation were determined for each group (n=4) (Table 6). In addition, a scatter chart of each group is shown in FIG. 11.

TABLE 6

|  | GAG/HYP | |
| --- | --- | --- |
|  | Average value | Standard deviation |
| Nucleotomy group (n = 4) | 8.9 | 1.7 |
| Treatment group (n = 4) | 10.0 | 2.3 |
| Normal control group (n = 4) | 17.8 | 4.4 |
| Articular cartilage (n = 4) | 3.1 | 0.6 |

As a result, the average GAG/HYP value of the normal control group (nucleus pulposus of the intervertebral disc) was 17.8 which was higher than 3.1 of the untreated articular cartilage. The average GAG/HYP values of the nucleotomy group and the treatment groups four weeks after the surgery were lower than that of the normal control group. The average GAG/HYP value of the treatment groups showed a tendency of being slightly higher than that of the nucleotomy group. Accordingly, the nucleus pulposus of the intervertebral disc had a higher sulfated glycosaminoglycan (GAG)/hydroxyproline (HYP) ratio than the articular cartilage, suggesting that the component ratios constituting these tissues are different, and also that the tissue characteristics are different between the nucleus pulposus of the intervertebral disc and the articular cartilage. The composition of the present invention was considered to have possibility of recovering such compositional characteristics of a nucleus pulposus.

The invention claimed is:

1. A method of treating or reducing a degeneration and/or an injury of an intervertebral disc, wherein the degeneration and/or the injury comprises a defective site in a nucleus pulposus of the intervertebral disc, the method comprises applying to the defective site of a nucleus pulposus of an intervertebral disc in a subject in need thereof via a composition-filling inlet on the surface of the intervertebral disc a composition in a sol state to fill the defective site, the composition comprising a low endotoxin monovalent metal salt of alginic acid, and allowing a solid gel to form from a first portion of the composition after the applying by bringing a crosslinking agent into contact with the composition-filling inlet on the surface of the intervertebral disc, such that a second portion, which is other than the first portion, of the composition remains in the sol state, wherein the first portion corresponds to the surface of the composition located at the surface inlet and the second portion corresponds to the remainder of the composition other than the surface.

2. A method of treating or reducing a degeneration and/or an injury of an intervertebral disc, wherein the degeneration and/or the injury comprises a defective site in a nucleus pulposus of the intervertebral disc, the method comprises applying to the defective site of a nucleus pulposus of an intervertebral disc of a subject in need thereof via a composition-filling inlet on the surface of the intervertebral disc a composition comprising a low endotoxin monovalent metal salt of alginic acid to fill the defective site and curing the composition after the applying by bringing a crosslinking agent into contact with at least a part of the surface of the composition in the composition-filling inlet on the surface of the intervertebral disc, wherein the composition has fluidity when applied to the defective site, and wherein the composition is gelled only on the surface thereof.

3. The method according to claim 2, wherein the degeneration and/or the injury is at least one selected from the group consisting of disc herniation, discopathy, degenerative spondylolisthesis, pyogenic discitis, spondylosis deformans, spinal canal stenosis, and an intervertebral disc injury.

4. The method according to claim 1, wherein the defective site is formed by removing at least a part of the nucleus pulposus of the intervertebral disc of the subject.

5. The method according to claim 2, wherein the defective site is formed by removing at least a part of the nucleus pulposus of the intervertebral disc of the subject.

6. The method according to claim 1, wherein said reducing comprises reducing recurrence rate of the degeneration of the intervertebral disc.

7. The method according to claim 2, wherein said reducing comprises reducing recurrence rate of the degeneration of the intervertebral disc.

8. The method according to claim 1, wherein said applying suppresses a decrease in a height of the intervertebral disc at the defective site.

9. The method according to claim 2, wherein said applying suppresses a decrease in a height of the intervertebral disc at the defective site.

10. The method according to claim 1, wherein the defective site is a degenerated part, a shrunken part or a removed part of the nucleus pulposus resulting from aging, trauma, infection, or a surgical operation.

11. The method according to claim 2, wherein the defective site is a degenerated part, a shrunken part or a removed part of the nucleus pulposus resulting from aging, trauma, infection, or a surgical operation.

12. The method according to claim 1, wherein the composition, which has the first portion as the solid gel and the second portion in the sol state, does not deviate from the defective site when a compression force is applied from head and tail sides of the intervertebral disc.

13. The method according to claim 2, wherein after said applying, the cured composition does not deviate from the defective site when a compression force is applied from head and tail sides of the intervertebral disc.

14. The method according to claim 1, wherein said applying increases a ratio of Type II collagen antibody-positive cells in the nucleus pulposus of the intervertebral disc of the subject.

15. The method according to claim 2, wherein said applying increases a ratio of Type II collagen antibody-positive cells in the nucleus pulposus of the intervertebral disc of the subject.

16. The method according to claim 2, wherein the apparent viscosity of the composition having fluidity is 500 mPa·s-6,000 mPa·s as measured with a cone-plate viscometer under a condition where the measurement temperature is 20° C., the rotation speed is 0.5 rpm, and the reading time is 2.5 minutes of measurement to obtain the average of the values taken during the period from 0.5 to 2.5 minutes after the start of the measurement as the apparent viscosity.

17. The method according to claim 2, wherein a weight-average molecular weight (absolute molecular weight) of the low endotoxin monovalent metal salt of alginic acid is 80,000 or more as measured by a GPC-MALS method.

18. The method according to claim 2, wherein the concentration of the low endotoxin monovalent metal salt of alginic acid is 0.5 w/w %-5 w/w %.

19. The method according to claim 2, wherein the composition does not contain the crosslinking agent in an amount that allows curing of the composition before the application to the defective site site of the nucleus pulposus of the intervertebral disc of the subject.

20. The method according to claim 2, wherein the composition is applied to the defective site of the nucleus pulposus by an injection with a 21G needle after leaving the composition to stand at 20° C. for an hour.

21. The method according to claim 2, wherein the composition does not contain a cell.

22. The method according to claim 2, wherein the crosslinking agent is a divalent or higher valent metal ion compound.

23. The method according to claim 2, wherein the composition is applied in combination with at least one selected from the group consisting of a cell and a growth factor.

24. The method according to claim 23, wherein the cell is selected from nucleus pulposus cells, stem cells, stromal cells, mesenchymal, stem cells, and marrow stromal cells, ES cells and iPS cells, and the growth factor is selected from BMP, FGF, VEGF, HGF, TGF-β, IGF-1, PDGF, CDMP (cartilage-derived-morphogenetic protein), CSF, EPO, IL, PRP (Platelet Rich Plasma) growth factors, SOX and IF.

25. The method according to claim 1, wherein the degeneration and/or the injury is at least one selected from the group consisting of disc herniation, discopathy, degenerative spondylolisthesis, pyogenic discitis, spondylosis deformans, spinal canal stenosis, and an intervertebral disc injury.

* * * * *